United States Patent
Tanomoto et al.

(10) Patent No.: US 11,003,581 B2
(45) Date of Patent: May 11, 2021

(54) ARITHMETIC PROCESSING DEVICE AND ARITHMETIC PROCESSING METHOD OF CONTROLLING PREFETCH OF CACHE MEMORY

(71) Applicant: FUJITSU LIMITED, Kawasaki (JP)

(72) Inventors: Masakazu Tanomoto, Kawasaki (JP); Hideki Okawara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/452,621

(22) Filed: Jun. 26, 2019

(65) Prior Publication Data

US 2020/0026650 A1     Jan. 23, 2020

(30) Foreign Application Priority Data

Jul. 19, 2018 (JP) .............................. JP2018-135604

(51) Int. Cl.
*G06F 12/0862* (2016.01)
*G06F 12/0811* (2016.01)
*G06F 9/30* (2018.01)

(52) U.S. Cl.
CPC ...... *G06F 12/0862* (2013.01); *G06F 9/30043* (2013.01); *G06F 12/0811* (2013.01); *G06F 2212/1021* (2013.01); *G06F 2212/602* (2013.01)

(58) Field of Classification Search
CPC ............. G06F 12/0862; G06F 12/0811; G06F 2212/6024
See application file for complete search history.

(56) References Cited

U.S. PATENT DOCUMENTS

| | | | |
|---|---|---|---|
| 2009/0287884 | A1 | 11/2009 | Toyoshima et al. |
| 2012/0072702 | A1* | 3/2012 | Pierson ............... G06F 12/0862 712/207 |
| 2017/0300416 | A1 | 10/2017 | Yamamura |
| 2019/0065376 | A1* | 2/2019 | Lee ..................... G06F 12/0862 |

FOREIGN PATENT DOCUMENTS

| | | |
|---|---|---|
| JP | 2017-191503 | 10/2017 |
| WO | 2008/093399 | 8/2008 |

* cited by examiner

*Primary Examiner* — David E Martinez
(74) *Attorney, Agent, or Firm* — Fujitsu Patent Center

(57) ABSTRACT

An arithmetic processing device includes circuitry configured to add an identifier of a request source that generates a prefetch request into the prefetch request, and output, in response to detecting a certain number of cache hits less than a first threshold, each of the cache hits occurring in a first cache memory provided at a lower hierarchical level than a second cache memory by each prefetch request into which a first identifier is added, a notification for suppressing a prefetch request issued for the lower hierarchical level of the first cache memory from a first request source identified by the first identifier.

14 Claims, 17 Drawing Sheets

| ACCESS PATTERN MONITORING UNIT ID | PREFETCH ADDRESS | NUMBER OF TIMES OF ISSUANCE | L1HWPF DISTANCE | L2HWPF DISTANCE | L2HWPF SUPPRESSION FLAG |

| CORE ID | MONITORING UNIT ID | SUPPRESSION FLAG | SUPPRESSION COUNTER | RESEMPTION COUNTER |
|---|---|---|---|---|
| 0 | 1 | 0 | 2 | 0 |
| 0 | 2 | 1 | 0 | 1 |
| ... | ... | ... | ... | ... |
| 1 | M | 0 | 1 | 0 |

FIG. 11

| INCREMENT CONDITIONS OF SUPPRESSION COUNTER | SUPPRESSION FLAG IS 0, HIERARCHICAL LEVEL OF PREFETCH REQUEST IS EQUAL TO CORRESPONDING HIERARCHICAL LEVEL, AND CACHE HIT OCCURS IN CACHE MEMORY OF CORRESPONDING HIERARCHICAL LEVEL. |
|---|---|
| INCREMENT CONDITIONS OF RESUMPTION COUNTER | SUPPRESSION FLAG IS 1, HIERARCHAL LEVEL OF PREFETCH REQUEST IS HIGHER THAN CORRESPONDING HIERARCHICAL LEVEL, AND CACHE MISS OCCURS IN CACHE MEMORY OF CORRESPONDING HIERARCHICAL LEVEL. |

FIG. 13

| ACCESS PATTERN MONITORING UNIT ID | PREFETCH ADDRESS | NUMBER OF TIMES OF ISSUANCE | L1HWPF DISTANCE | L2HWPF DISTANCE | L3HWPF DISTANCE | L1HWPF SUPPRESSION FLAG | L2HWPF SUPPRESSION FLAG | L3HWPF SUPPRESSION FLAG |
|---|---|---|---|---|---|---|---|---|

| | |
|---|---|
| INCREMENT CONDITIONS OF SUPPRESSION COUNTER | SUPPRESSION FLAG IS 0, HIERARCHICAL LEVEL OF PREFETCH REQUEST IS EQUAL TO CORRESPONDING HIERARCHICAL LEVEL, AND CACHE HIT OCCURS IN CACHE MEMORY OF CORRESPONDING HIERARCHICAL LEVEL. |
| INCREMENT CONDITIONS OF RESUMPTION COUNTER | SUPPRESSION FLAG IS 1, REQUEST TYPE IS DEMAND, AND CACHE MISS OCCURS IN CACHE MEMORY OF CORRESPONDING HIERARCHICAL LEVEL. |

ARITHMETIC PROCESSING DEVICE AND ARITHMETIC PROCESSING METHOD OF CONTROLLING PREFETCH OF CACHE MEMORY

CROSS-REFERENCE TO RELATED APPLICATION

This application is based upon and claims the benefit of priority of the prior Japanese Patent Application No. 2018-135604, filed on Jul. 19, 2018, the entire contents of which are incorporated herein by reference.

FIELD

The embodiments discussed herein are related to arithmetic processing technology.

BACKGROUND

Data used by an arithmetic processing unit (or processor) such as a central processing unit (CPU) is generally stored in a main memory device. However, it takes time to access a main memory device (or main memory) having a large capacity. A small-capacity cache memory included in the arithmetic processing unit is accessible in a shorter time. Therefore, part of the data is held in the cache memory. The use of the cache memory enables reduced latency and thus increased processing speed.

When an arithmetic processing unit uses data, the arithmetic processing unit is able to execute a process with small latency if the data is already stored in the cache memory. On the other hand, if the data to be used is not held in the cache memory, the data has to be moved to the cache memory that is closest to an execution control unit of the arithmetic processing unit. If such a data movement is started after it is confirmed that the arithmetic processing unit is to use the data, the latency increases. Therefore, prefetching is performed in which it is predicted in advance that the data is to be used and the data is moved from the main memory device to the cache memory beforehand. Prefetching enables increased processing speed of the arithmetic processing unit.

Cache memory sometimes has a hierarchical structure in which a plurality of cache memories are combined. Generally, in a cache memory having a hierarchical structure, a cache memory having a hierarchical level closer to the execution control unit has a smaller capacity but has a faster access speed, whereas a cache memory having a hierarchical level closer to the main memory device has a larger capacity but has a slower access speed. The hierarchical levels of the cache memories are generally expressed as level 1 (L1), level 2 (L2), . . . , and so forth from the side closer to the execution control unit.

A prefetch request is executable for each of the cache memories of the respective hierarchical levels. The main memory device holds all of the data but is slower than the slowest cache memory. Suppose that, when data is requested, the data is not held in any of the cache memories of all the hierarchical levels and the data is moved from the main memory device. Latency in such a case is the largest. The latency decreases as the cache memory of the upper hierarchical level holds the data. Therefore, it is desirable to move data to be used to the L1 cache memory of the uppermost hierarchical level L1 beforehand in order to improve the performance of the arithmetic processing unit.

However, the L1 cache memory has a small capacity due to the characteristics thereof. If prefetching timing is too early, the capacity of the L1 cache memory becomes insufficient before the data is actually used. When the capacity of the L1 cache memory becomes insufficient, the data that has been prefetched is moved out from the L1 cache memory in order to write other data in the L1 cache memory. On the other hand, if prefetching is performed on the L1 cache memory in a state in which the data to be used is not held in the L2 cache memory having the hierarchical level lower than the L1 cache memory, the cache memories having the lower hierarchical levels and the main memory device are accessed. Therefore, the latency increases and the movement of the data does not complete before the arithmetic processing unit uses the data. Thus, the effect of the prefetching on the performance of the arithmetic processing unit is small.

There has been proposed a method for solving the aforementioned inconvenience that may be caused by the timing of prefetching. According to this proposed method, prefetching of data to a cache memory of a lower hierarchical level, which has a sufficient capacity, is requested first. Then, prefetching of the data to a cache memory of an upper hierarchical level is sequentially requested with a time difference. In this way, the data is moved to the fastest L1 cache memory around the timing at which the data is used.

When prefetching is performed according to the method in which the hierarchical level is specified in this manner, the cache memory of the specified hierarchical level sometimes holds the requested data already. Prefetching of data to the cache memory of the hierarchical level that already holds the data is redundant. However, processing related to redundant prefetching is executed until prefetching of data to a cache memory of a certain hierarchical level is found to be redundant. When the processing related to redundant prefetching is executed, other processing is suspended because of the processing and the overall performance of the arithmetic processing unit lowers. In addition, since the processing which does not contribute to the performance improvement is executed, the power consumption increases.

Prefetching explicitly instructed in program code is referred to as software prefetching (SWPF). Prefetching automatically generated by hardware, regardless of the contents of the program code, is referred to as hardware prefetching (HWPF). As an example of the related art for reducing redundant HWPF, there is a technique for suppressing HWPF until a certain period elapses upon issuance of the redundant HWPF being counted a plurality of times by using a timer (see, for example, Japanese Laid-open Patent Publication No. 2017-191503).

A HWPF request is generally generatable independently for each of a plurality of access patterns. For example, in a program using a plurality of variables, a plurality of HWPF requests corresponding to access patterns of the respective variables are generable at the same time. In the related art, the number of times a HWPF request results in a hit in a cache memory having the hierarchical level specified in the HWPF request (hereinafter, referred to as a corresponding hierarchical level) is counted. The issuance of all the HWPF requests is uniformly suppressed upon the count reaching a certain threshold. Since issuance of a HWPF request generated based on an access pattern other than that of the HWPF request causing the suppression is also suppressed, prefetching that is effective for improving the performance of the arithmetic processing unit is also suppressed. As a result, the performance of the arithmetic processing unit lowers.

For example, the related art is disclosed in PCT International Publication No. WO 2008/093399 and Japanese Laid-open Patent Publication No. 2017-191503.

SUMMARY

According to an aspect of the embodiments, an arithmetic processing device includes circuitry configured to add an identifier of a request source that generates a prefetch request into the prefetch request, and output, in response to detecting a certain number of cache hits less than a first threshold, each of the cache hits occurring in a first cache memory provided at a lower hierarchical level than a second cache memory by each prefetch request into which a first identifier is added, a notification for suppressing a prefetch request issued for the lower hierarchical level of the first cache memory from a first request source identified by the first identifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a configuration of an access pattern monitoring unit illustrated in FIG. 6;

FIG. 9 is a diagram illustrating an example of a configuration of a prefetching control table illustrated in FIG. 7;

FIG. 11 is a diagram for describing an example of increment conditions of a suppression counter and a resumption counter;

FIG. 13 is a diagram illustrating an example of a configuration of an access pattern monitoring unit illustrated in FIG. 12;

FIG. 17 is a diagram for describing an example of increment conditions of a suppression counter and a resumption counter.

DESCRIPTION OF EMBODIMENTS

Since arithmetic processing units according to the related art have difficulty in efficiently controlling prefetching, it is difficult to improve the performance of the arithmetic processing units.

With an arithmetic processing unit and a method for controlling an arithmetic processing unit disclosed herein, redundant prefetching is suppressed and prefetching is effectively controlled. For example, an identifier for identifying a request source that has generated a prefetch request is added to the generated prefetch request. In response to a cache hit being observed a certain number of times for each identifier, only prefetching requested from the request source indicated by the identifier is suppressed out of prefetching performed on the same hierarchical level.

Effective cache control may be implemented by resuming only effective prefetching out of the suppressed prefetching. In this case, for an identifier for which prefetching to a certain hierarchical level has already been suppressed, a cache miss is observed in which prefetching results in a miss in a cache memory of the certain hierarchical level and a cache memory of a hierarchical level lower than the certain hierarchical level. In response to a cache miss being observed a certain number of times, the cache miss indicating a state in which prefetching results in a miss in the cache memory of the certain hierarchical level and further a miss in the cache memory of the lower hierarchical level, prefetching to the lower hierarchical level may be resumed.

Each embodiment of an arithmetic processing unit and a method for controlling an arithmetic processing unit disclosed herein will be described below with reference to the drawings.

In a first embodiment, a processor such as a CPU, which is an example of an arithmetic processing unit, includes cache memory having a two-level hierarchical structure, that is, a level-1 (L1: primary) cache memory and a level-2 (L2: secondary) cache memory, for example. In the following description, hardware prefetching (HWPF) to the L1 cache memory is denoted by L1HWPF, and HWPF to the L2 cache memory is denoted by L2HWPF.

Figure 1:
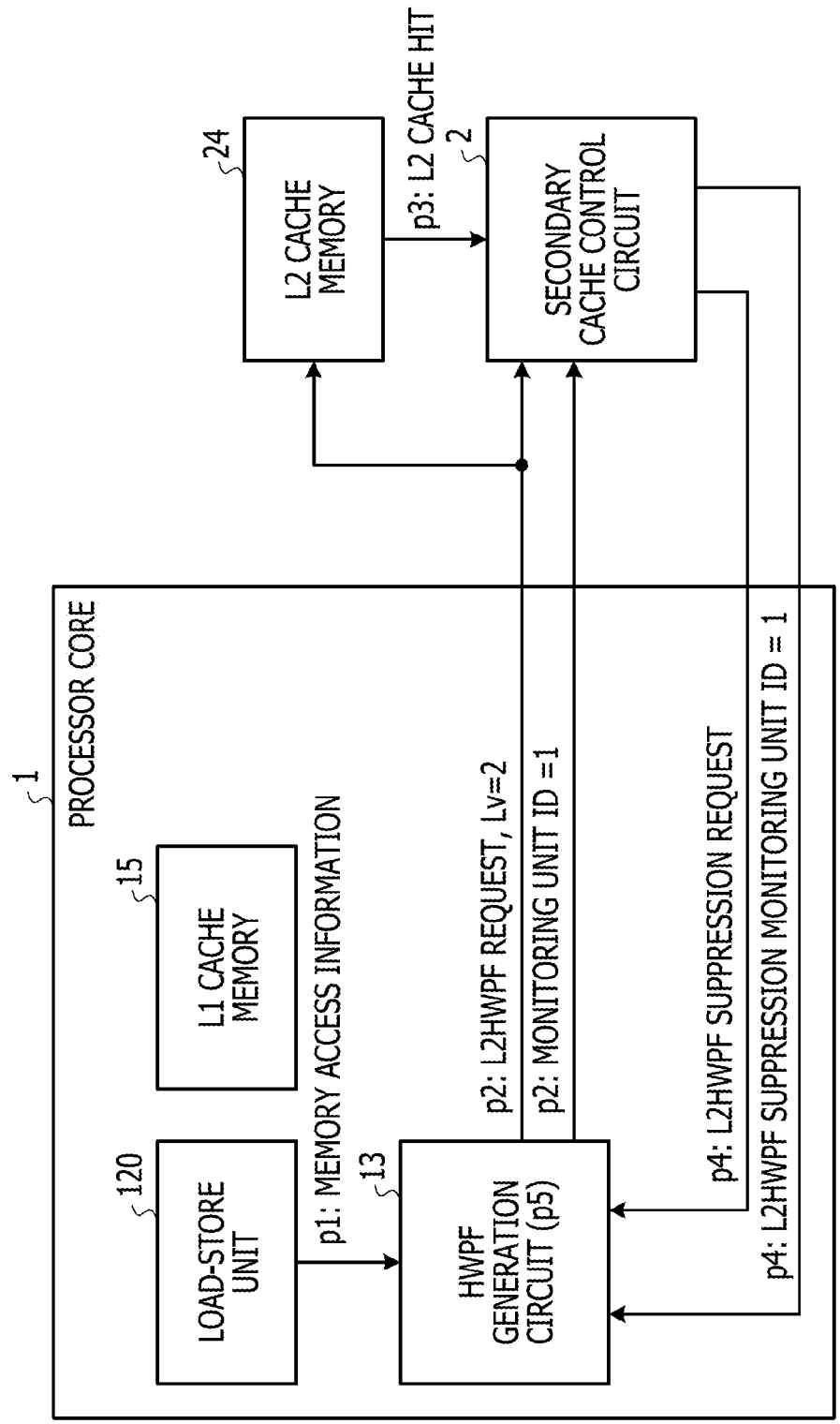
FIG. 1 is a schematic diagram for describing an example of a HWPF suppression process.
Figure 2:
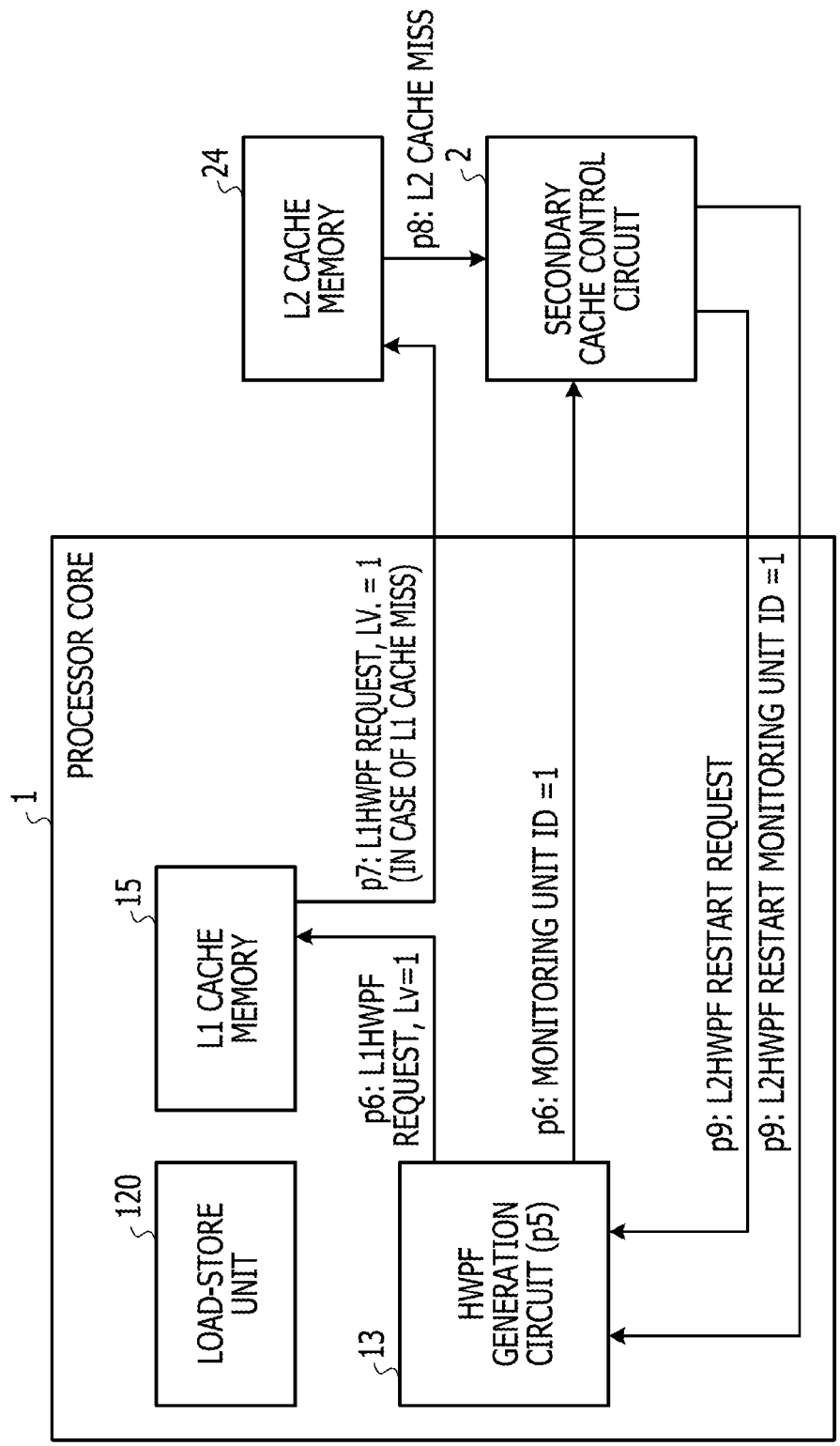
FIG. 2 is a schematic diagram for describing an example of a HWPF resumption process.

An example of processes for suppressing and resuming L2HWPF in the case where the processor includes an L1 cache memory and an L2 cache memory is described with reference to FIGS. 1 and 2. FIG. 1 is a schematic diagram for describing an example of a HWPF suppression process. FIG. 2 is a schematic diagram for describing an example of a HWPF resumption process. In FIGS. 1 and 2, a processor core 1 of the processor includes a load-store unit 120, a HWPF generation circuit 13, and an L1 cache memory 15. The load-store unit 120 includes a load-store unit and a cache access pipeline, which will be described later. The processor core 1 is connected to an L2 cache memory 24 and a secondary cache control circuit 2. The secondary cache control circuit 2 includes a HWPF suppression and resumption circuit and so on, which will be described later. The HWPF suppression and resumption circuit includes a prefetching control table and so on, which will be described later. The secondary cache control circuit 2 may include the L2 cache memory 24.

A process for suppressing L2HWPF is executed in accordance with, for example, following procedures p1 to p5 in FIG. 1.

p1: In the load-store unit 120, the cache access pipeline generates memory access information from a load/store (LD/ST) request, which is an example of a memory access request from the load-store unit, and a LD/ST address. The load-store unit 120 outputs the memory access information to the HWPF generation circuit 13.

p2: The HWPF generation circuit 13 monitors the memory access information supplied from the cache access pipeline of the load-store unit 120 and generates a prefetch request based on an access pattern. The prefetch request is generatable, for example, by generating, at regular intervals, an address obtained by adding a certain value to an address used in a load (LD) instruction while updating the value to be added. However, the method for generating a prefetch request itself is not particularly limited. Since prefetching is issued in an order of L2HWPF and L1HWPF, the HWPF generation circuit 13 generates an L2HWPF request first. Because the generated request is an L2HWPF request, the hierarchical level Lv. for which HWPF is requested is 2 (Lv.=2). A monitoring unit ID generated by the HWPF generation circuit 13 at the same time as the L2HWPF request is an ID for identifying an access pattern monitoring unit, which is a request source that has generated the L2HWPF request among a plurality of access pattern monitoring units included in the HWPF generation circuit 13. In this example, the monitoring unit ID is 1 (ID=1). The HWPF generation circuit 13 outputs the L2HWPF request to the L2 cache memory 24 and the secondary cache control circuit 2 and outputs the monitoring unit ID of 1 to the secondary cache control circuit 2.

A HWPF request is generable independently for each of a plurality of access patterns. For example, in a program using a plurality of variables, a plurality of HWPF requests corresponding to access patterns of the respective variables are generable at the same time. The plurality of access pattern monitoring units of the HWPF generation circuit 13 serve as, for example, request sources that generate prefetch requests corresponding to the plurality of access patterns. The monitoring unit ID is an example of an identifier (ID) for identifying a request source that has generated a prefetch request.

p3: In the case where a search in the L2 cache memory 24 in response to the L2HWPF request results in a hit in the L2 cache memory 24, the HWPF suppression and resumption circuit of the secondary cache control circuit 2 receives a notification indicating an L2 cache hit. In this case, the HWPF suppression and resumption circuit increments the value of a suppression counter of the prefetching control table corresponding to the L2HWPF request and the monitoring unit ID of 1 that are input in the procedure p2.

p4: If the value of the suppression counter of the prefetching control table exceeds a threshold, the HWPF suppression and resumption circuit notifies the HWPF generation circuit 13 of an L2HWPF suppression request for suppressing L2HWPF, together with the monitoring unit ID of 1.

p5: The HWPF generation circuit 13 suppresses L2HWPF requested by the access pattern monitoring unit having the monitoring unit ID of 1, based on the L2HWPF suppression request. As a result, the access pattern monitoring unit having the monitoring unit ID of 1 is permitted to issue only an L1HWPF request until there is an L2HWPF resumption request. In this way, redundant L2HWPF that results in a hit in the L2 cache memory 24 may be suppressed. On the other hand, the access pattern monitoring units each having the monitoring unit ID other than the monitoring unit ID of 1 are permitted to issue L1HWPF and L2HWPF requests as long as there is no HWPF suppression request for the corresponding hierarchical level Lv.

The HWPF generation circuit 13 constitutes an example of a prefetching unit that adds an ID for identifying a request source that has generated a prefetch request to the generated prefetch request. In addition, the HWPF suppression and resumption circuit of the secondary cache control circuit 2 constitutes an example of a controller. The controller observes, for each ID, a cache hit indicating that a prefetch request results in a hit the L2 cache memory 24 provided at a lower hierarchical level than the L1 cache memory 15. In response to observing the cache hit a certain number of times, the controller outputs, to the prefetching unit, a signal which is an example of information for suppressing only prefetching requested by the request source out of prefetching performed for the hierarchical level of 2 (Lv.=2) that is the hierarchical level of the L2 cache memory 24.

As described above, prefetching may be efficiently controlled by improving the mechanism for uniformly suppressing HWPF of the related art and by selectively suppressing only redundant HWPF for each access pattern. In this way, only redundant unnecessary prefetching is suppressed for each access pattern, whereas a reasonable prefetch request is permitted. Thus, the performance of the processor may be improved.

On the other hand, a process for resuming L2HWPF after suppressing the L2HWPF is executed in accordance with, for example, following procedures p6 to p10 in FIG. 2. As an example, a case will be described in which an L1HWPF request is generated by an access pattern monitoring unit that is included in the HWPF generation circuit 13, that has the monitoring unit ID of 1, and for which L2HWPF is suppressed.

p6: In this case, the HWPF generation circuit 13 generates an L1HWPF request. Since the L1HWPF request is generated, the requested hierarchical level is 1 (Lv.=1). The HWPF generation circuit 13 also generates the monitoring unit ID of 1 at the same time as the L1HWPF request. The HWPF generation circuit 13 outputs the L1HWPF request to the L1 cache memory 15 and outputs the monitoring unit ID of 1 to the secondary cache control circuit 2. In the case where a search in the L1 cache memory 15 in response to the L1HWPF request results in a hit in the L1 cache memory 15, the L1HWPF ends.

p7: In the case where the search in the L1 cache memory 15 in response to the L1HWPF request results in a miss, the L1 cache memory 15 outputs the L1HWPF request to the L2 cache memory 24 and the secondary cache control circuit 2 while maintaining the requested hierarchical level at 1 (Lv.=1).

p8: In the case where the search in the L2 cache memory 24 in response to the L1HWPF request results in a miss, the HWPF suppression and resumption circuit of the secondary cache control circuit 2 is notified of the L2 cache miss. In this case, upon receipt of the L1HWPF request, the HWPF suppression and resumption circuit acquires a resumption counter and a suppression flag of the prefetching control table corresponding to the monitoring unit ID of 1. In the case of the L2 cache miss, the HWPF suppression and resumption circuit also increments the resumption counter of the prefetching control table. In the case where the search in the L2 cache memory 24 in response to the L1HWPF request results in a hit in the L2 cache memory 24, the L1HWPF on the L2 cache memory 24 is ended.

p9: If the value of the resumption counter exceeds the threshold, the HWPF suppression and resumption circuit resets the suppression flag. At the same time, the HWPF suppression and resumption circuit notifies the HWPF generation circuit 13 of an L2HWPF resumption request together with the monitoring unit ID of 1 of the access pattern monitoring unit for which L2HWPF is to be resumed.

p10: In the case where the HWPF generation circuit 13 receives the L2HWPF resumption request together with the monitoring unit ID of 1, the access pattern monitoring unit having the monitoring unit ID of 1 resumes L2HWPF. Thus, L2HWPF may be resumed, which is confirmed to be effective for improvement of the performance of the processor if the L2HWPF is issued prior to L1HWPF because data to be prefetched through L1HWPF is not held in the L2 cache memory 24.

The HWPF suppression and resumption circuit of the secondary cache control circuit 2 constitutes an example of a controller that outputs, to the prefetching unit, a signal that is an example of information for resuming prefetching. The controller observes, for an ID for which prefetching to the L2 cache memory 24 has already been suppressed, a cache miss indicating that prefetching to the L1 cache memory 15 results in a miss and further a miss in the L2 cache memory 24. In response to observing the cache miss a certain number of times, the controller outputs, to the prefetching unit, a signal that is an example of information for resuming the prefetching in the hierarchical level of 2 (Lv.=2) of the L2 cache memory 24.

In the related art, issuance of a HWPF request that has been suppressed is resumed in response to a lapse of a certain period by using a timer. However, it is difficult to set the certain period to the optimum prefetching suppression period. In the case where issuance of a HWPF request that has been suppressed is resumed after a certain period, HWPF may be suppressed over a period in which HWPF is supposed to be effective if the certain period is set longer than the optimum prefetching suppression period. Thus, the performance of the arithmetic processing unit lowers.

In contrast, in the present embodiment, the mechanism of the related art for uniformly resuming issuance of a HWPF request that has been suppressed is improved. Specifically, for example, issuance of a HWPF request for which a status has changed from redundant to effective again is resumed out of HWPF requests suppressed for respective access patterns. In this way, efficient cache control may be implemented. Thus, the performance of the processor may be improved by detecting, for each access pattern, that prefetching is effective again and then resuming issuance of the prefetch request.

Figure 3:
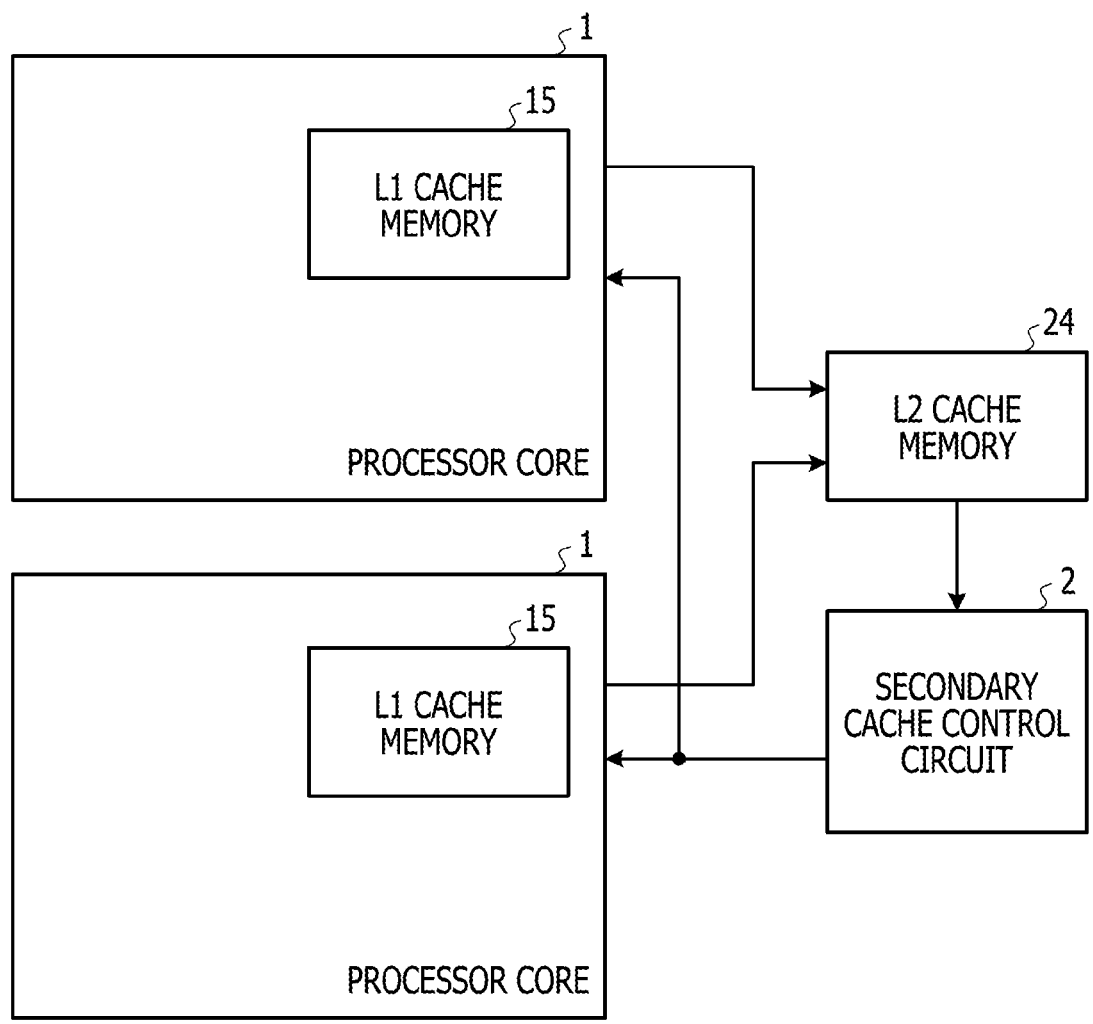
FIG. 3 is a diagram schematically illustrating an example of a processor including two processor cores.

FIG. 3 is a diagram schematically illustrating an example of a processor including two processor cores. Since components that are the same as or similar to those illustrated in FIGS. 1 and 2 are denoted by the same reference numerals in FIG. 3, a description thereof will be omitted. In this example, the processor includes cache memory having a two-level hierarchical structure, that is, the L1 cache memory 15 and the L2 cache memory 24, for example. As illustrated in FIG. 3, the two processor cores 1 each include the L1 cache memory 15. The two processor cores 1 share the L2 cache memory 24.

Each component of the processor will now be described in more detail with reference to FIGS. 4 to 7. Input and output of each component of the processor will be described first. Then, a process performed by each component of the processor will be described.

Figure 4:
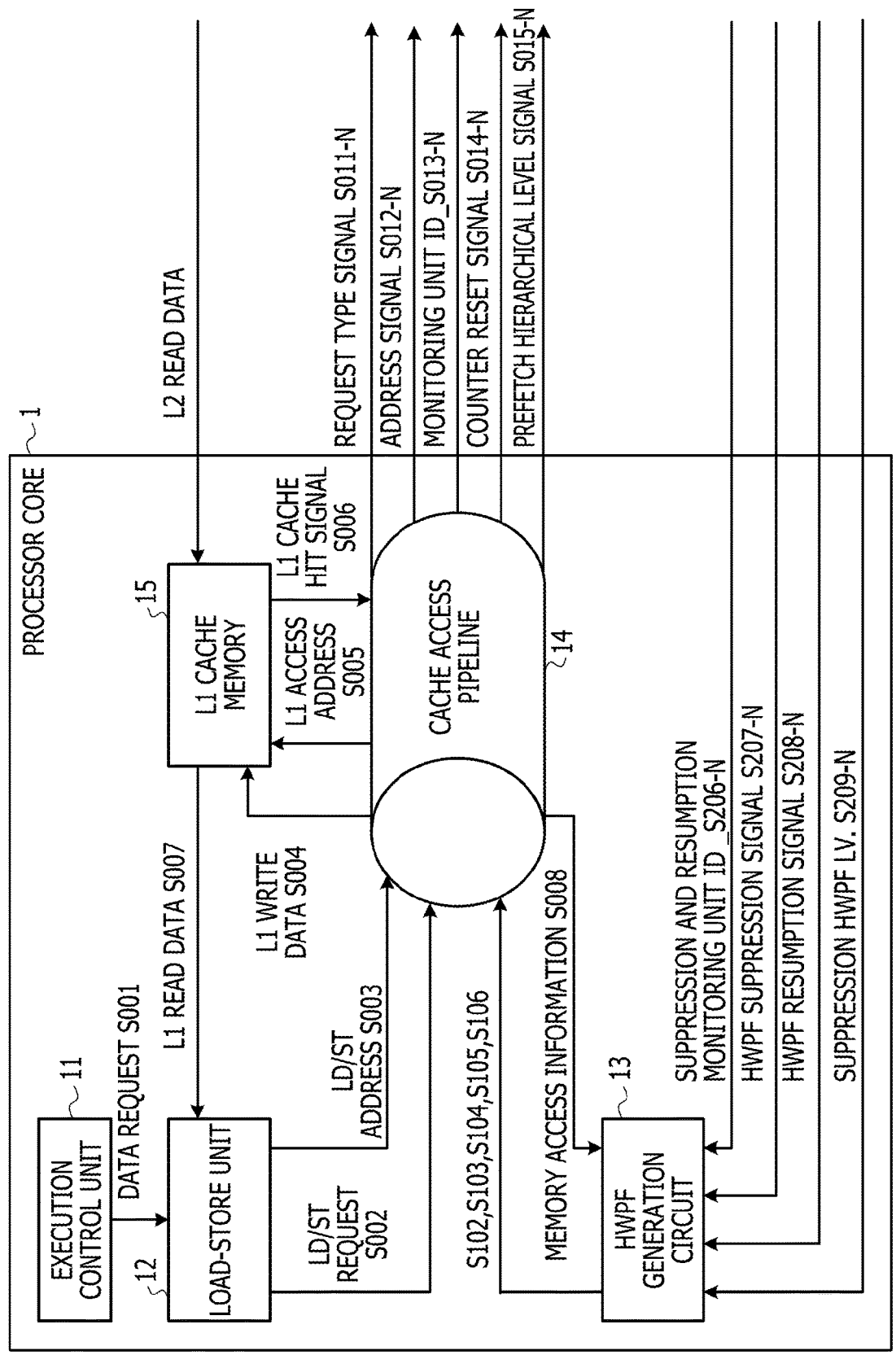
FIG. 4 is a block diagram illustrating an example of a processor core according to a first embodiment.

FIG. 4 is a block diagram illustrating an example of the processor core 1 according to the first embodiment. The processor core 1 constitutes a processor, such as a CPU, which is an example of an arithmetic processing unit. In this example, the processor core 1 has a core ID of N (ID=N) for the convenience of explanation. The processor may include the plurality of processor cores 1 having the same configuration. For example, in the case where the processor includes the two processor cores 1 as illustrated in FIG. 3, the core ID of one of the processor cores 1 may be set to 0 (ID=0) and the core ID of the other processor core 1 may be set to 1 (ID=1), as will be described later. The processor includes cache memory having a two-level hierarchical structure. In this example, the two hierarchical levels are L1 and L2.

The processor core 1 includes an execution control unit 11, a load-store unit 12, the HWPF generation circuit 13, a cache access pipeline 14, and the L1 cache memory 15. The load-store unit 12 and the cache access pipeline 14 constitute an example of the load-store unit 120 illustrated in FIGS. 1 and 2.

The execution control unit 11 outputs a data request S001 to input the data request S001 to the load-store unit 12. A suppression and resumption monitoring unit ID_S206-N, a HWPF suppression signal S207-N, a HWPF resumption signal S208-N, and a suppression HWPF level (Lv.) S209-N are input to the HWPF generation circuit 13 from the secondary cache control circuit 2, which will be described later with reference to FIG. 5. L2 read data S310 is input to the L1 cache memory 15 from the secondary cache control circuit 2. L1 read data S007 output by the L1 cache memory 15 is input to the load-store unit 12. An L1 cache hit signal S006 output by the L1 cache memory 15 is input to the cache access pipeline 14. A LD/ST request S002 and a LD/ST address S003 output from the load-store unit 12 are input to the cache access pipeline 14. The HWPF generation circuit 13 outputs a HWPF request S102, a HWPF address S103, a monitoring unit ID_S104, a counter reset signal S105, and a HWPF Lv. S106 to input these to the cache access pipeline 14. The cache access pipeline 14 inputs L1 write data S004 and an L1 access address S005 to the L1 cache memory 15. The cache access pipeline 14 outputs a request type signal S011-N, an address signal S012-N, a monitoring unit ID_S013-N, a counter reset signal S014-N, and a prefetch hierarchical level signal S015-N to input these to the secondary cache control circuit 2.

Figure 5:
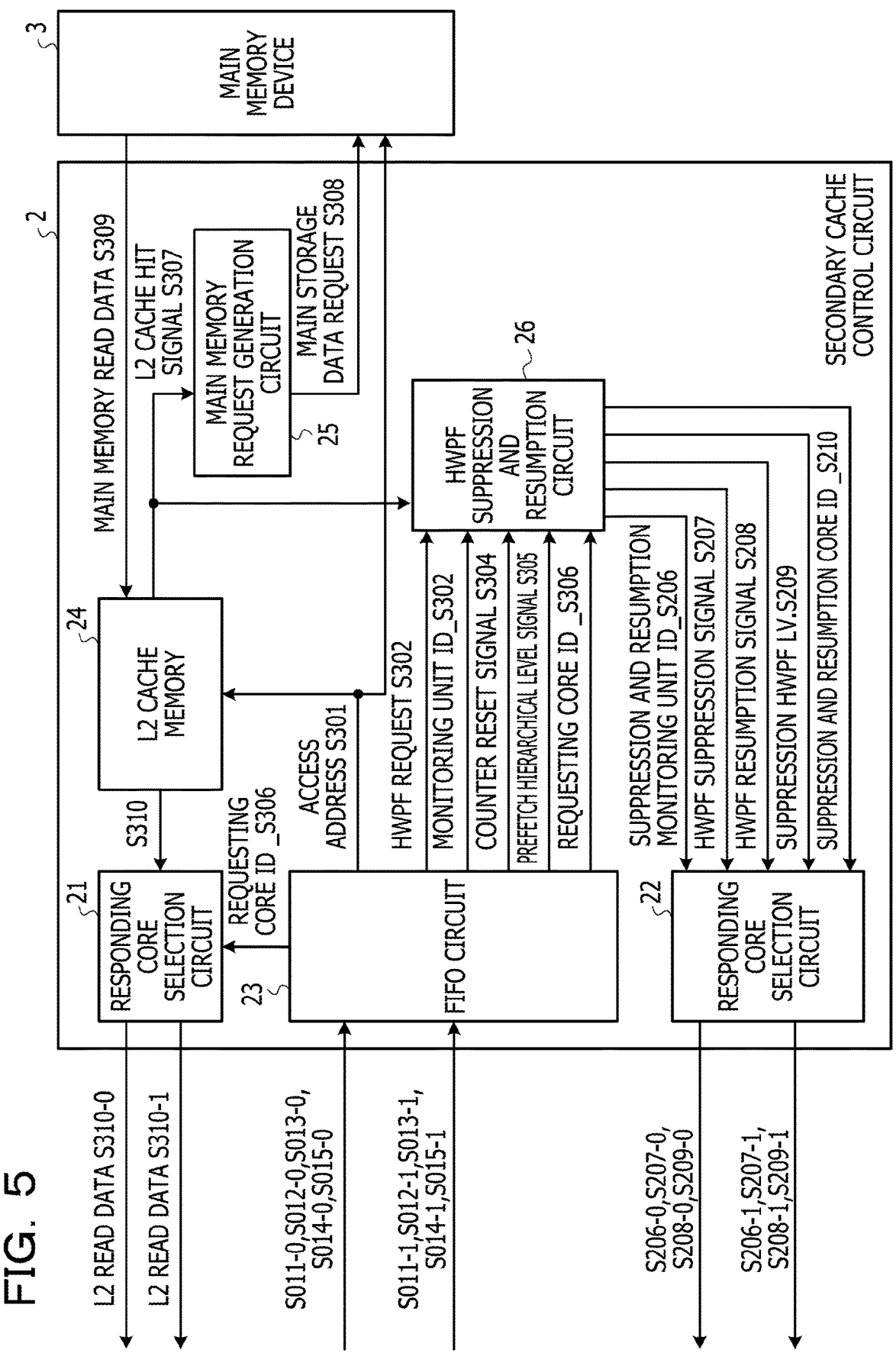
FIG. 5 is a block diagram illustrating an example of a secondary cache control circuit and a main memory device according to the first embodiment.

FIG. 5 is a block diagram illustrating an example of the secondary cache control circuit 2 and a main memory device 3 according to the first embodiment. FIG. 5 illustrates, together with the main memory device 3, a configuration of the secondary cache control circuit 2 in the case where the processor includes the two processor cores 1 as illustrated in FIG. 3. In the case where the processor includes one processor core 1, signals or the like supplied to the processor core 1 are limited to signals for the core ID of 0, for example, and signals or the like supplied from the processor core 1 are limited to signals from the processor core 1 having the core ID of 0, for example.

The secondary cache control circuit 2 illustrated in FIG. 5 includes responding core selection circuits 21 and 22, a first-in-first-out (FIFO) circuit 23, the L2 cache memory 24, a main memory request generation circuit 25, and a HWPF suppression and resumption circuit 26.

In this example, a total of two processor cores 1, specifically, the processor core 1 having the core ID of 0 and the processor core 1 having the core ID of 1, are connectable to the main memory device 3 through the secondary cache control circuit 2. A request type signal S011-0, an address signal S012-0, a monitoring unit ID_S013-0, a counter reset signal S014-0, and a prefetch hierarchical level signal S015-0 are input to the FIFO circuit 23 from the processor core 1 having the core ID of 0. A request type signal S011-1, an address signal S012-1, a monitoring unit ID_S013-1, a counter reset signal S014-1, and a prefetch hierarchical level signal S015-1 are input to the FIFO circuit 23 from the processor core 1 having the core ID of 1. A requesting core ID_S306 output from the FIFO circuit 23 is input to the responding core selection circuit 21. An access address S301 output from the FIFO circuit 23 is input to the L2 cache memory 24 and the main memory device 3. A HWPF request S302, a monitoring unit ID_S303, a counter reset signal S304, a prefetch hierarchical level signal S305, and the requesting core ID_S306 that are output by the FIFO circuit 23 are input to the HWPF suppression and resumption circuit 26.

An L2 cache hit signal S307 output from the L2 cache memory 24 is input to the main memory request generation circuit 25 and the HWPF suppression and resumption circuit 26. A main memory data request S308 output from the main memory request generation circuit 25 is input to the main memory device 3. A main memory read data S309 output from the main memory device 3 is input to the L2 cache memory 24. A suppression and resumption monitoring unit ID_S206, a HWPF suppression signal S207, a HWPF resumption signal S208, a suppression HWPF Lv. S209, and a suppression and resumption core ID_S210 output from the HWPF suppression and resumption circuit 26 are input to the responding core selection circuit 22. The responding core selection circuit 22 inputs a suppression and resumption monitoring unit ID_S206-0, a HWPF suppression signal S207-0, a HWPF resumption signal S208-0, and a suppression HWPF Lv. S209-0 to the processor core 1 having the core ID of 0. The responding core selection circuit 22 also inputs a suppression and resumption monitoring unit ID_S206-1, a HWPF suppression signal S207-1, a HWPF resumption signal S208-1, and a suppression HWPF Lv. S209-1 to the processor core 1 having the core ID of 1.

Figure 6:
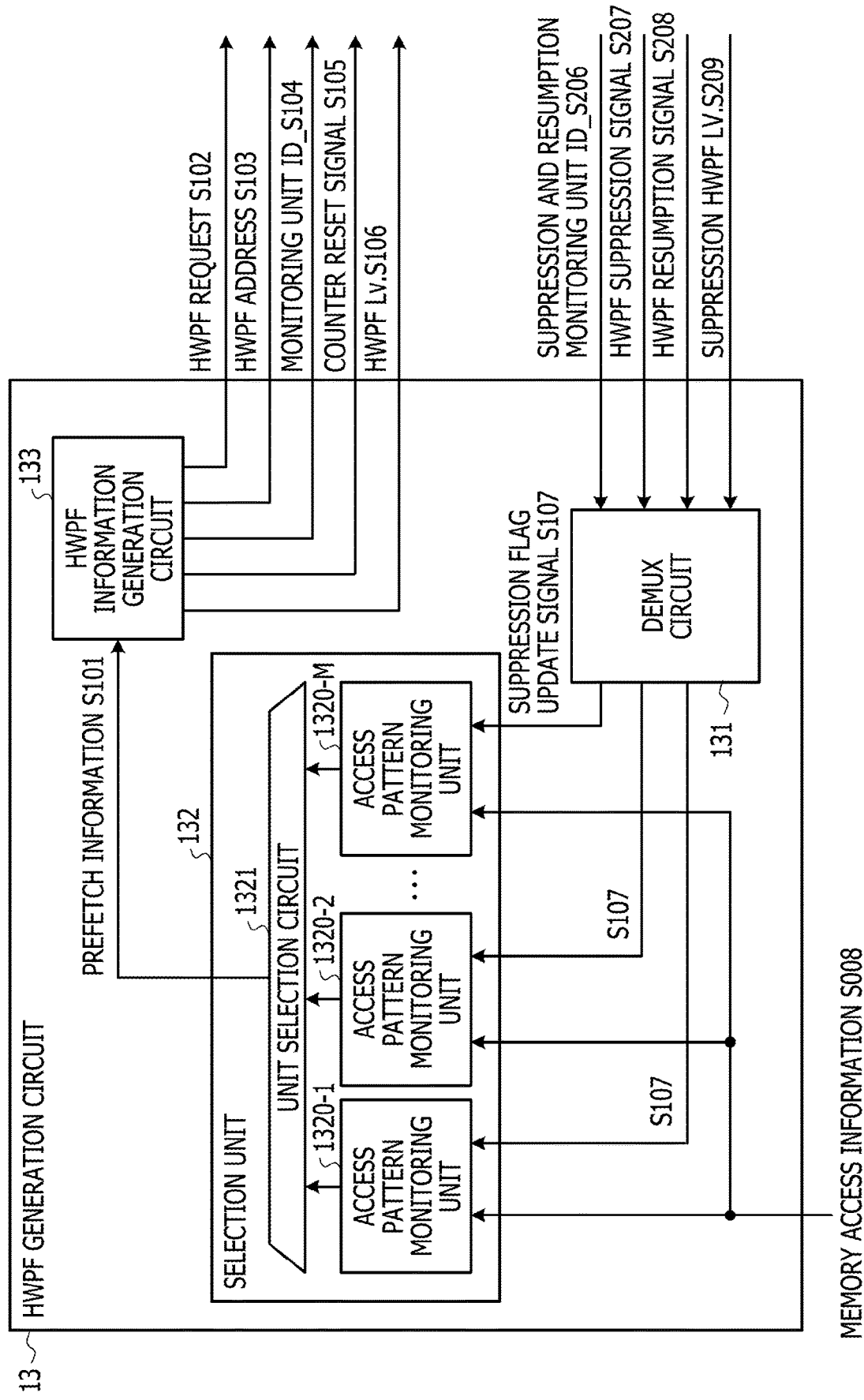
FIG. 6 is a block diagram illustrating an example of a HWPF generation circuit illustrated in FIG. 4.

FIG. 6 is a block diagram illustrating an example of the HWPF generation circuit 13 illustrated in FIG. 4. The HWPF generation circuit 13 includes a demultiplexer (DEMUX) circuit 131, a selection unit 132, and a HWPF information generation circuit 133. The selection unit 132 includes M access pattern monitoring units 1320-1 to 1320-M and a unit selection circuit 1321.

The suppression and resumption monitoring unit ID_S206, the HWPF suppression signal S207, the HWPF resumption signal S208, and the suppression HWPF Lv. S209 that are supplied from the secondary cache control circuit 2 illustrated in FIG. 5 are input to the DEMUX circuit 131 illustrated in FIG. 6. The DEMUX circuit 131 outputs a suppression flag update signal S107 to input the suppression flag update signal S107 to each of the access pattern monitoring units 1320-1 to 1320-M. The memory access information S008 supplied from the cache access pipeline 14 illustrated in FIG. 4 is input to each of the access pattern monitoring units 1320-1 to 1320-M. The unit selection circuit 1321 outputs prefetch information S101 of the access pattern monitoring unit selected from among the access pattern monitoring units 1320-1 to 1320-M to input the prefetch information S101 to the HWPF information generation circuit 133. The HWPF information generation circuit 133 outputs HWPF information including the HWPF request S102, the HWPF address S103, the monitoring unit ID_S104, the counter reset signal S105, and the HWPF Lv. S106 to input the HWPF information to the cache access pipeline 14 of the processor core 1. In the HWPF information, the HWPF request S102, which is an example of a prefetch request, is attached by the monitoring unit ID_S104, which is an example of an ID for identifying an access pattern monitoring unit serving as a request source that has generated the prefetch request.

Figure 7:
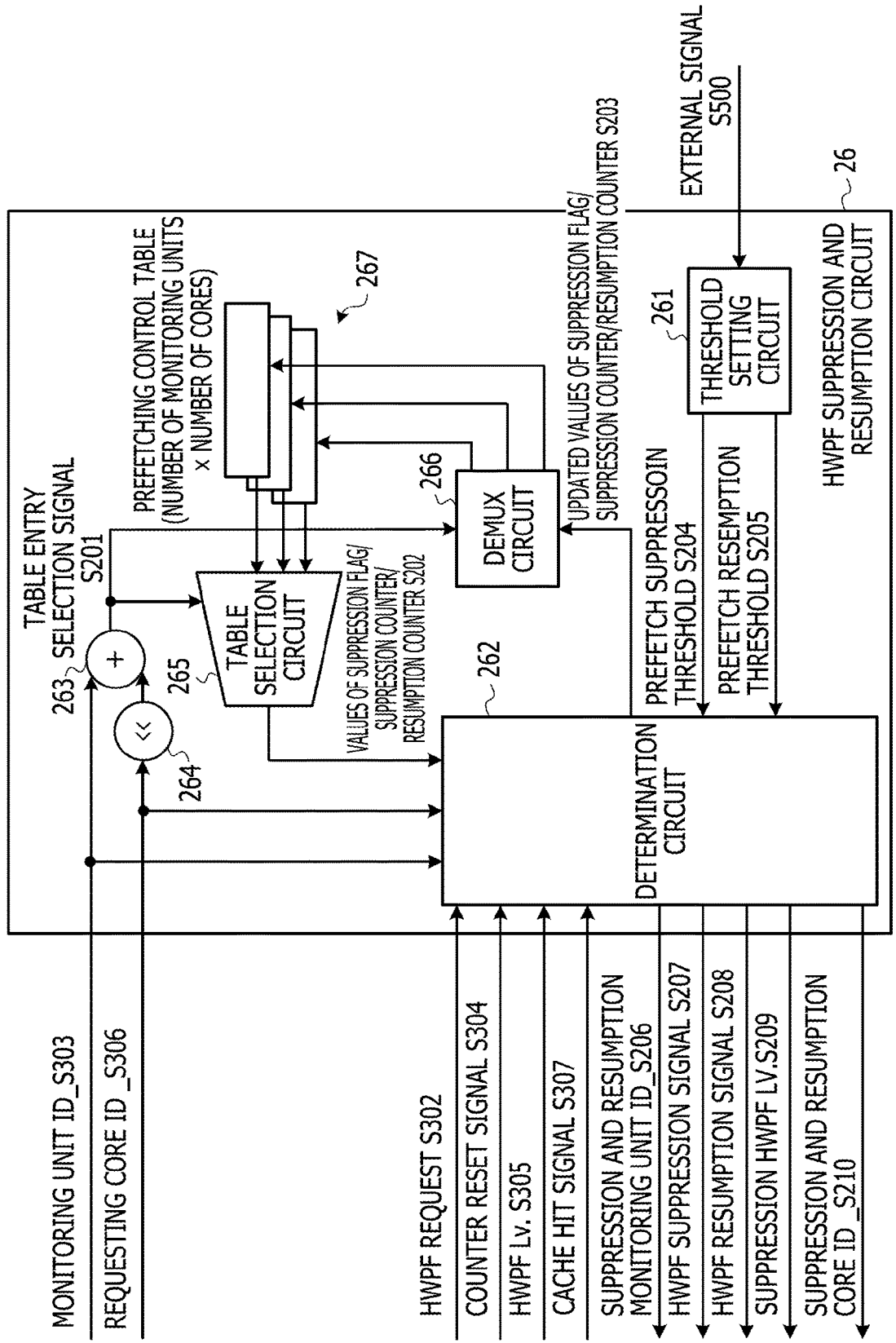
FIG. 7 is a block diagram illustrating an example of a HWPF suppression and resumption circuit illustrated in FIG. 5.

FIG. 7 is a block diagram illustrating an example of the HWPF suppression and resumption circuit 26 illustrated in FIG. 5. The HWPF suppression and resumption circuit 26 includes a threshold setting circuit 261, a determination circuit 262, an addition circuit 263, a left shift circuit 264, a table selection circuit 265, a DEMUX circuit 266, and a prefetching control table 267. The left shift circuit 264 shifts each bit of the input requesting core ID_S306, for example, to the left by a certain number of bits and outputs the result.

The monitoring unit ID_S303 output from the FIFO circuit 23 illustrated in FIG. 5 is input to the addition circuit 263 and the determination circuit 262. The requesting core ID_S306 output from the FIFO circuit 23 is input to the left shift circuit 264 and the determination circuit 262. The HWPF request S302, the counter reset signal S304, and the prefetch hierarchical level signal S305 that are output from the FIFO circuit 23 and the cache hit signal S307 output from the L2 cache memory 24 are input to the determination circuit 262. The threshold setting circuit 261 outputs a prefetch suppression threshold S204 and a prefetch resumption threshold S205 to input these to the determination circuit 262. The threshold setting circuit 261 may be a memory device in which the prefetch suppression threshold S204 and the prefetch resumption threshold S205 are stored in advance. In addition, the threshold setting circuit 261 may set the prefetch suppression threshold S204 and the prefetch resumption threshold S205 based on an external signal S500. The determination circuit 262 outputs each of update values S203 of the suppression flag, the suppression counter, and the resumption counter to input the update values S203 to the DEMUX circuit 266.

The addition circuit 263 outputs a table entry selection signal S201 obtained by adding the monitoring unit ID_S303 and the output of the left shift circuit 264 together to input the table entry selection signal S201 to the table selection circuit 265 and the DEMUX circuit 266. The addition circuit 263 and the left shift circuit 264 constitute an example of a circuit that generates information for referring to each entry of each table in the prefetching control table 267. The prefetching control table 267 includes "the number of monitoring units x the number of cores" tables. Here, the "number of monitoring units" is M, which is the number of access pattern monitoring units 1320-1 to 1320-M of the one processor core 1. The "number of cores" is the number of processor cores 1 (two in this example) included in the processor. The table selection circuit 265 selects the output of the prefetching control table 267 corresponding to the output of the DEMUX circuit 266 in accordance with the table entry selection signal S201. The table selection circuit 265 also outputs values S202 of the suppression flag, the suppression counter, and the resumption counter to input the values S202 to the determination circuit 262. The determination circuit 262 outputs the suppression and resumption monitoring unit ID_S206, the HWPF suppression signal S207, the HWPF resumption signal S208, the suppression HWPF Lv. S209, and the suppression and resumption core ID_S210 to input these to the responding core selection circuit 22.

FIG. 8 is a diagram illustrating an example of a configuration of the access pattern monitoring unit illustrated in FIG. 6. The access pattern monitoring unit 1320-$i$ ($i$=1 to M) includes the monitoring unit ID (access pattern monitoring unit ID) of the access pattern monitoring unit itself, the prefetch address of the access pattern monitoring target, and the number of times the access pattern monitoring unit 1320-i has already issued a prefetch request. The access pattern monitoring unit 1320-i further includes prefetch distances to be added when a HWPF request is made to each hierarchical level, and the L2HWPF suppression flag that is supplied from the HWPF suppression and resumption circuit 26 and is used in the present embodiment. In this example, the prefetch distances include an L1HWPF distance and an L2HWPF distance. Each of the M access pattern monitoring units 1320-1 to 1320-M stores different prefetch information and independently generates prefetch information.

Information to be held to generate prefetch information, information to be notified of by the load-store unit 12 or the like of the processor to hold the information, and information on a timing at which new information is registered or generation of prefetching is started may be determined as appropriate. Generally, these pieces of information are determined from the address accessed by the LD/ST instruction in the program, the number of hits in the L1 cache memory 15, the past data access, the change in the address, and so on. In the present embodiment, a specific configuration of a circuit that serves as an input source to the HWPF suppression and resumption circuit 26 illustrated in FIG. 7 and determines the information is not particularly limited as long as the circuit is capable of generating signals corresponding to the monitoring unit ID_S104, the counter reset signal S105, and the HWPF Lv. S106 illustrated in FIG. 6.

FIG. 9 is a diagram illustrating an example of a configuration of the prefetching control table 267 illustrated in FIG. 7. As illustrated in FIG. 9, the prefetching control table 267 includes, for each core ID of the processor core 1, M entries, the number of which is the number of the access pattern monitoring units 1320-1 to 1320-M. The prefetching control table 267 also includes, for each entry, the monitoring unit ID, the suppression flag, the suppression counter, and the resumption counter. The monitoring unit ID is an ID of the access pattern monitoring unit managed by the corresponding entry. The suppression flag is a flag indicating whether or not a request from a request source indicated by the monitoring unit ID is suppressed. The suppression counter and the resumption counter are counters that are used for the status transition and are used to determine the suppression and resumption of HWPF.

An example of a process for suppressing L2HWPF in the configurations illustrated in FIGS. 4 and 5 in the present embodiment will be described in more detail next. In FIGS. 4 and 5, signals or the like related to writing of data from the L1 cache memory 15 to the L2 cache memory 24 and writing of data from the L2 cache memory 24 to the main memory device 3 are not illustrated. Control performed in writing data differs depending on which of a write-back system or a write-through system is adopted for the cache memory. However, in the present embodiment, control which is similar to that of the general processor and which is carried out using either method is performed. Thus, a description of the control performed in writing data will be omitted.

The process for suppressing L2HWPF is executed in accordance with, for example, following procedures P1 to P4.

P1: In response to the data request S001 output from the execution control unit 11 of the processor core 1 illustrated in FIG. 4, the load-store unit 12 outputs the LD/ST request signal S002 and the LD/ST address S003 to enter the LD/ST request signal S002 and the LD/ST address S003 to the cache access pipeline 14. Information indicating that the data request S001 has been generated is set in the LD/ST request signal S002. The LD/ST destination address is set in the LD/ST address S003. In the case of a store instruction involving writing (that is, requiring writing), the L1 write data S004 is also set by the cache access pipeline 14.

P2: The cache access pipeline 14 notifies, by using in the memory access information S008, the HWPF generation circuit 13 of the information obtained when the LD/ST instruction has been processed. In response to the notification of the memory access information S008, the HWPF generation circuit 13 illustrated in FIG. 6 selects the access pattern monitoring unit that is in a state in which a prefetch request is generatable from among the M access pattern monitoring units 1320-1 to 1320-M included therein. In the case where 1 is set in the HWPF suppression signal S207 input to the processor core 1, the selection unit 132 selects the access pattern monitoring unit indicated by the suppression and resumption access pattern monitoring unit ID_S206 which the DEMUX circuit 131 is notified of simultaneously with the HWPF suppression signal S207. The selection unit 132 also sets prefetch information stored in the selected access pattern monitoring unit in the prefetch information S101. In the case where there are a plurality of access pattern monitoring units that are in a state in which a prefetch request is generatable, one access pattern monitoring unit that is in a state in which a prefetch request is generatable may be selected according to a predetermined rule such as a priority order, for example. The unit selection circuit 1321 selects one of the access pattern monitoring units that are in a state in which a prefetch request is generatable. At the same time as selection of the access pattern monitoring unit, the prefetch information may be newly registered or updated in each of the access pattern monitoring units 1320-1 to 1320-M in accordance with the memory access information S008. The HWPF information generation circuit 133 generates the HWPF request S102, the HWPF address S103, the monitoring unit ID_S104, the counter reset signal S105, and the HWPF Lv. S106, from the prefetch information S101 of the selected access pattern monitoring unit. The HWPF request S102 indicates that the prefetch request is valid. The HWPF address S103 indicates the prefetch destination. The monitoring unit ID_S104 indicates the monitoring unit ID of the access pattern monitoring unit. The counter reset signal S105 indicates that the HWPF request is newly started in the case where the number of times prefetching has already been issued is 0 times. The HWPF Lv. S106 is the HWPF hierarchical level signal indicating that the prefetch destination is the cache of the n-th hierarchical level. When it is attempted to generate a HWPF request for the hierarchical level for which a suppression notification is already issued by the HWPF suppression and resumption circuit 26, the HWPF request is not issued.

The HWPF request S102, the HWPF address S103, the monitoring unit ID_S104, and the counter reset signal S105 are input to the cache access pipeline 14 when the HWPF request is valid. Since the cache access pipeline 14 is also used for the LD/ST instruction in the present embodiment, the cache access pipeline 14 sequentially processes the HWPF request and the LD/ST instruction by causing waiting when the HWPF request and the LD/ST instruction occur at the same time. As for the mechanism used in this case, there is a method in which a plurality of pipelines are provided or the like. Thus, the hardware configuration and the control method therefor used in the case where waiting is caused to sequentially process the HWPF request and the LD/ST instruction are not particularly limited in the present embodiment.

The cache access pipeline 14 sequentially processes the LD/ST request or the prefetch request. In the pipeline processing, in the case of L2HWPF, the request is sent to the L2 cache memory 24 regardless of whether there is an L1 cache hit. In the case of the other request (load, store, or L1HWPF request), the address (the LD/ST address S003 or the HWPF address S103) given by the request is set in the L1 access address S005. A search is performed to determine whether the data is held in the L1 cache memory 15. Then, the L1 cache hit signal S006 is set.

In the case of the L1 cache hit, the data read from the L1 cache memory 15 is set in the L1 read data S007 in the case of the load instruction, data of the L1 write data S004 is written in the L1 cache memory 15 in the case of the store instruction, and the prefetch request to the hierarchical level L2 is cancelled in the case of the L1HWPF request.

In the case of an L1 cache miss or in the case where the request is an L2HWPF request, the request is sent to the L2 cache memory 24. The cache access pipeline 14 sets, in the request type signal S011-N, information indicating which of the load instruction, the store instruction, or the prefetch request the request corresponds to, and sets the address signal (the LD/ST address S003 or the HWPF address S103) in the address signal S012-N. In the case where the request is the prefetch request, the monitoring unit ID_S104, the counter reset signal S105, and the HWPF Lv. S106 generated by the HWPF generation circuit 13 are set to the monitoring unit ID S013-N, the counter reset signal S014-N, and the prefetch hierarchical level signal S015-N, respectively, through the cache access pipeline 14. The core ID (0 or 1) is assigned to each of the two processor cores 1 that share the L2 cache memory 24. The signals from the processor core 1 assigned the core ID of 0 are referred to as signals S011-0, S012-0, and so on, whereas the signals from the processor core 1 assigned the core ID of 1 is referred to as S011-1, S012-1, and so on. Although there are two sets of signals in this example, the secondary cache control circuit 2 is capable of determining which of the processor cores 1 has issued the request.

The L2 cache memory 24 includes an arbitration function since the L2 cache memory 24 simultaneously accepts requests from the plurality of processor cores 1 having the core ID of 0 and the core ID of 1. In the present embodiment, an arbitration method is adopted in which requests are temporarily accumulated using a FIFO circuit and the requests are taken out and processed one by one.

P3: The secondary cache control circuit 2 illustrated in FIG. 5 takes out a request from among the requests accumulated in the FIFO circuit 23, and sets information selected in each signal. Information indicating the processor core 1 that has issued the request is stored in the FIFO circuit 23 at the same time when the request is stored in the FIFO circuit 23. When the request is read from the FIFO circuit 23, the information is set as the core ID in the requesting core ID_S306. The monitoring unit ID_S013-0, the counter reset signal S014-0, and the prefetch hierarchical level signal S015-0 which are associated with the core ID of 0 and the monitoring unit ID_S013-1, the counter reset signal S014-1, and the prefetch hierarchical level signal S015-1 which are associated with the core ID of 1 are input to the FIFO circuit 23, as the signals related to prefetching.

Once a request is taken out from the FIFO circuit 23, a search is performed in the L2 cache memory 24 by using the access address signal S301, and the L2 cache hit signal S307 is generated. The HWPF suppression and resumption circuit 26 is also notified of the L2 cache hit signal S307. In the case of the L2 cache hit and the LD/ST request and L1HWPF for which data is to be returned to the L1 cache memory 15, the data is read to the L2 read data S310 from the L2 cache memory 24. Then, the responding core selection circuit 21 selects the processor core 1 to which the data is to be returned in accordance with to the requesting core ID_S306. The value of the L2 read data S310 is set in the L2 read data S310-0 in the case of the core ID of 0 or in the L2 read data S310-1 in the case of the core ID of 1.

P4: In the case of an L2 cache miss, the main memory data request S308 for the main memory device 3 is set to be valid, and the request for the data is sent to the main memory device 3 together with the access address S301.

In parallel with this processing, in the case where a prefetch request is selected from the FIFO circuit 23, the monitoring unit ID_S303, the counter reset signal S304, and the prefetch hierarchical level signal S305 that are output from the FIFO circuit 23 together with the HWPF request signal S302 and the requesting core ID_S306 in FIG. 5 are input to the HWPF suppression and resumption circuit 26. the monitoring unit ID_S303, the counter reset signal S304, and the prefetch hierarchical level signal S305 are signals related to prefetching.

The HWPF suppression and resumption circuit 26 controls suppression and resumption of L2HWPF in accordance with, for example, following procedures P21 to P25 in FIG. 7. In FIG. 7, the prefetch suppression threshold S204 output from the threshold setting circuit 261 is a threshold for suppressing prefetching to the corresponding hierarchical level. If the number of times of a cache hit at the corresponding hierarchical level exceeds this value, HWPF is suppressed. In FIG. 7, the prefetch resumption threshold S205 output from the threshold setting circuit 261 is a threshold for resuming HWPF to the corresponding hierarchical level. If the number of times HWPF to the upper hierarchical level results in a cache miss at the corresponding hierarchical level exceeds this value, HWPF to the corresponding hierarchical level is resumed.

P21: In FIG. 7, a circuit that generates information used for referring to each entry in each table of the prefetching control table 267 generates a table entry selection signal S201 from a set of the monitoring unit ID_S303 and the requesting core ID_S306. The table entry selection signal S201 may be generated by using, for example, the monitoring unit ID_S303 as lower indices (added by the addition circuit 263 without any operation) and using the requesting core ID_S306 as upper indices (added after being left-shifted by the left shift circuit 264 by the bit width of the monitoring unit ID). The table selection circuit 265 selects the corresponding entry of the prefetching control table 267 by using the table entry selection signal S201. The values of the selected suppression flag, suppression counter, and resumption counter are set to the respective values S202 of the suppression flag, the suppression counter, and the resumption counter.

P22: In FIG. 7, the determination circuit 262 determines whether to suppress or resume prefetching and generates update values of the suppression and the resumption counters, based on the HWPF request S302, the monitoring unit ID_S303, the counter reset signal S304, the prefetch hierarchical level signal S305, the requesting core ID_S306, the prefetch suppression threshold S204, and the prefetch resumption threshold S205 in addition to the respective values S202.

Figure 10:
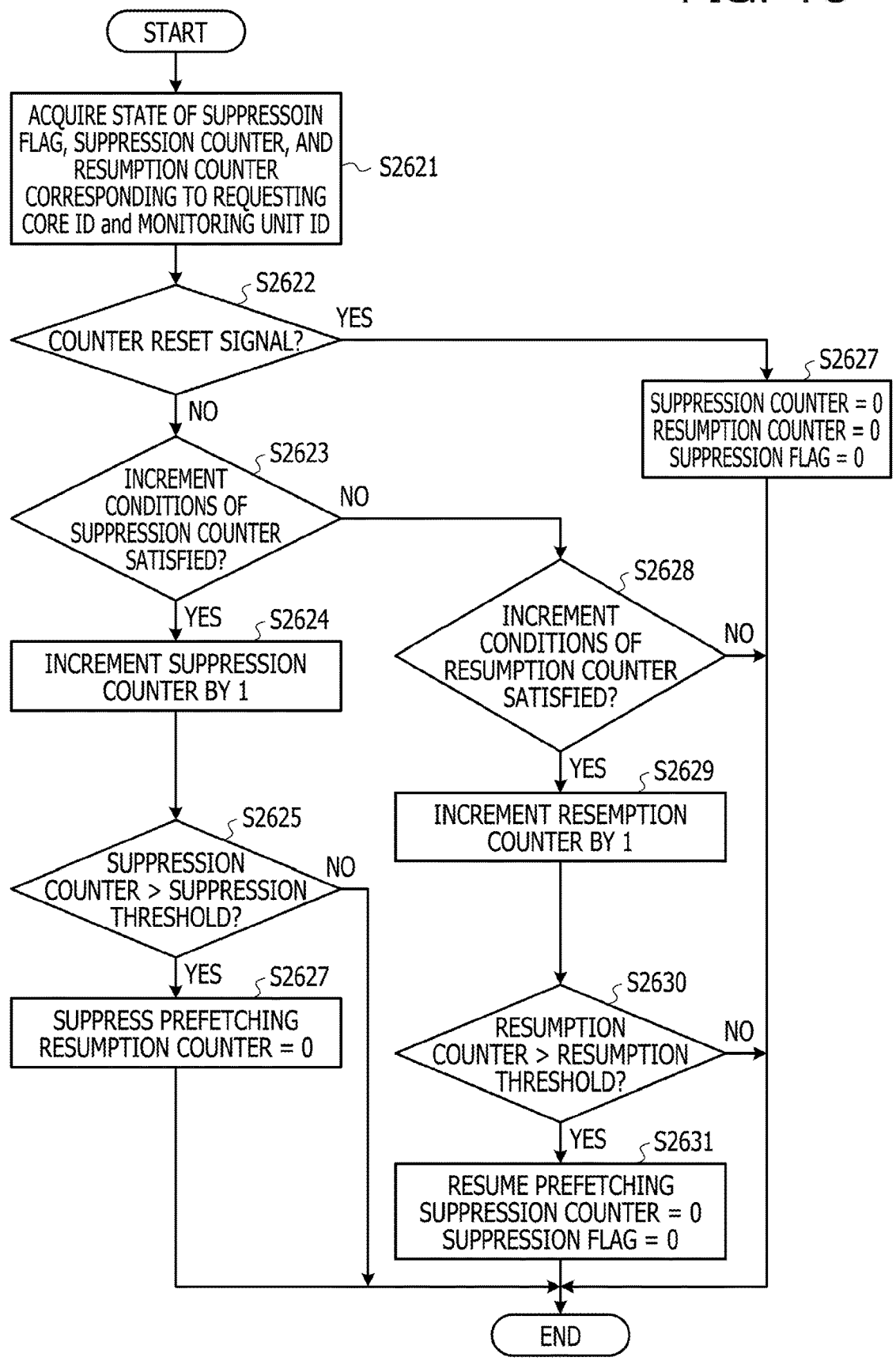
FIG. 10 is a flowchart illustrating an example of a process performed by a determination circuit illustrated in FIG. 7.

FIG. 10 is a flowchart for describing an example of a process performed by the determination circuit 262 illustrated in FIG. 7. FIG. 11 is a diagram for describing an example of increment conditions of the suppression counter and the resumption counter. The increment conditions of the suppression counter indicate that a HWPF request to the cache memory of the corresponding hierarchical level results in a cache hit, that is, the requested HWPF is redundant prefetching, for example. On the other hand, the increment conditions of the resumption counter indicate that the address requested by L1HWPF is also missed in the L2 cache memory 24 and the performance may be improved if L2HWPF is resumed. In the example illustrated in FIG. 11, the increment conditions of the suppression counter are that the suppression flag is 0, the hierarchical level of the prefetch request is equal to the corresponding hierarchical level, and a cache hit occurs in the cache memory of the corresponding hierarchical level. The increment conditions of the resumption counter are that the suppression flag is 1, the hierarchical level of the prefetch request is higher than the corresponding hierarchical level, and a cache miss occurs in the cache memory of the corresponding hierarchical level.

In FIG. 10, in step 2621, the determination circuit 262 acquires the state of the suppression flag, the suppression counter, and the resumption counter that correspond to the requesting core ID and the monitoring unit ID from the prefetching control table 267. In step 2622, the determination circuit 262 determines whether or not the counter reset signal S304 is input thereto. If the determination result in step 2622 is No, the determination circuit 262 determines whether or not the increment conditions of the suppression counter illustrated in FIG. 11 are satisfied in step 2623. If the determination result is Yes, the process proceeds to step 2624. In step 2624, the determination circuit 262 increments the suppression counter by 1. In step 2625, the determination circuit 262 determines whether or not the value of the suppression counter has exceeded the suppression threshold. If the determination result is Yes, the processing proceeds to step 2626. If the determination result is No, the process ends. In step 2626, the determination circuit 262 suppresses prefetching and sets the value of the resumption counter to 0. Then, the process ends.

If the determination result in step 2622 is Yes, the process proceeds to step 2627. In step 2627, the determination circuit 262 resets the values of the suppression counter and the resumption counter to 0 and resets the suppression flag to 0. Then, the process ends.

If the determination result in step 2623 is No, the process proceeds to step 2628. In step 2628, the determination circuit 262 determines whether or not the increment conditions of the resumption counter illustrated in FIG. 11 are satisfied. If the determination result is Yes, the process proceeds to step 2629. If the determination result is No, the process ends. In step 2629, the determination circuit 262 increments the resumption counter by 1. In step 2630, the determination circuit 262 determines whether or not the value of the resumption counter has exceeded the resumption threshold. If the determination result is Yes, the process proceeds to step 2631. If the determination result is No, the process ends. In step 2631, the determination circuit 262 resumes prefetching, sets the value of the suppression counter to 0, and resets the suppression flag to 0. Then, the process ends.

P23: In FIG. 7, the DEMUX circuit 266 selects an entry to be updated by using the table entry selection signal S201, and stores the update values S203 of the suppression flag, the suppression counter, and the resumption counter in the prefetching control table 267.

P24: In the case where the value of the suppression flag changes from 0 to 1, the determination circuit 262 sets 1 in the HWPF suppression signal S207 and sets the same value as the monitoring unit ID_S303 in the suppression and resumption monitoring unit ID_S206. The determination circuit 262 also sets the same value as the requesting core ID_S306 in the suppression and resumption core ID_S210. The suppression HWPF Lv. S209 is a signal for indicating the hierarchical level of suppressed HWPF. In the present embodiment, the suppression HWPF Lv. S209 is fixed to 2. The determination circuit 262 sets the values of the suppression and resumption monitoring unit ID_S206 and the HWPF suppression signal S207 in accordance with the core ID of the suppression and resumption core ID_S210. Specifically, the determination circuit 262 sets the values of the suppression and resumption monitoring unit ID_S206 and the HWPF suppression signal S207 respectively in the suppression and resumption monitoring unit ID_S206-0 and the HWPF suppression signal S207-0 in the case of the core ID of 0 and respectively in the suppression and resumption monitoring unit ID_S206-1 and the HWPF suppression signal S207-1 in the case of the core ID of 1, for example.

P25: In the case where the suppression flag changes from 1 to 0, the determination circuit 262 sets 1 in the HWPF resumption signal S208 and sets the same value as the monitoring unit ID_S303 in the suppression and resumption monitoring unit ID_S206. The determination circuit 262 also sets the same value as the requesting core ID_S306 in the suppression and resumption core ID_S210. The determination circuit 262 sets the values of the suppression and resumption monitoring unit ID_S206 and the HWPF resumption signal S208 in accordance with the suppression and resumption core ID_S210. Specifically, the determination circuit 262 sets the values of the suppression and resumption monitoring unit ID_S206 and the HWPF resumption signal S208 respectively in the suppression and resumption monitoring unit ID_S206-0 and the HWPF resumption signal S208-0 in the case of the core ID of 0 and respectively in the suppression and resumption monitoring unit ID_S206-1 and the HWPF resumption signal S208-1 in the case of the core ID of 1, for example.

In the case where 1 is set in the HWPF suppression signal S207-N input to the corresponding processor core 1, the HWPF generation circuit 13 selects, by using the DEMUX circuit 131, the access pattern monitoring unit 1320-$i$ indicated by the suppression and resumption monitoring unit ID_S206-N which the HWPF generation circuit 13 is notified of simultaneously with the HWPF suppression signal S207-N. The HWPF generation circuit 13 also sets the HWPF suppression flag to the hierarchical level indicated by the suppression HWPF Lv. S209, that is, the L2HWPF suppression flag in this example, in accordance with the suppression flag update signal S107. In the case where 1 is set in the HWPF resumption signal S208-N input to the corresponding processor core 1, the HWPF generation circuit 13 selects, by using the DEMUX circuit 131, the access pattern monitoring unit 1320-$i$ indicated by the suppression and resumption monitoring unit ID_S206-N which the HWPF generation circuit 13 is notified of simultaneously with the HWPF resumption signal S208-N. The HWPF generation circuit 13 also resets the L2HWPF suppression flag in accordance with the suppression flag update signal S107. In this way, the HWPF suppression and resumption circuit 26 is capable of controlling suppression and resumption of L2HWPF performed by the HWPF generation circuit 13.

In the present embodiment, prefetching may be efficiently controlled by suppressing redundant prefetching for each access pattern. Specifically, for example, an identifier for identifying a request source that has generated a prefetch request is added to the prefetch request, and a cache hit indicating that the prefetch request results in a hit in a cache memory is observed for each identifier. Then, in response to observation of the cache hit a certain number of times, only prefetching associated with the identifier of the request source is suppressed.

In addition, in the present embodiment, effective cache control may be implemented by resuming only effective prefetching out of prefetching suppressed for respective access patterns. Specifically, for an identifier for which prefetching to a corresponding hierarchical level has already been suppressed, the prefetching is resumed in response to observation of a cache miss indicating that prefetching results in a miss in a cache memory a certain number of times, for example.

In the present embodiment, the L2 cache memory 24 is subjected to HWPF; however, the hierarchical level of the cache memory subjected to HWPF is not limited particularly.

The present embodiment may be generalized in the case where the HWPF suppression and resumption circuit 26 is provided for a cache memory of an n-th hierarchical level (n=2 or greater) and prefetching to the n-th hierarchical level is suppressed. Note that, since there is no prefetch request to the upper hierarchical level than the L1 cache memory 15 for the L1 cache memory 15 which is the uppermost hierarchical level, the present embodiment is not applicable without any modification. However, the present embodiment may be generalized if a LD/ST request or the like corresponding to the monitoring unit ID of the access pattern monitoring unit for which prefetching is suppressed is regarded as L0HWPF to the 0-th hierarchical level and is used as a trigger for resuming HWPF.

For example, among the n hierarchical levels, the primary (L1) cache memory exchanges data with the execution control unit and the secondary (L2) cache memory. The n-th (Ln) cache memory exchanges data with the (n−1)-th (L(n−1)) cache memory and the main memory device. The cache memories from the secondary (L2) cache memory to the (n−1)-th (L(n−1)) cache memory exchange data with the cache memory of the upper hierarchical level thereof and the cache memory of the lower hierarchical level.

In a second embodiment, two processor cores share one L2 cache memory, and the two L2 memories share one level-3 (L3: tertiary) cache memory. That is, a processor includes cache memory having a three-level hierarchical structure. That is, the processor includes the L1 cache memory 15, the L2 cache memory 24, and an L3 cache memory 33, for example. Each of the two processor cores 1 includes one L1 cache memory 15. The two processor cores 1 share one L2 cache memory 24. Furthermore, the two L2 cache memories 24 share the L3 cache memory 33. An example of controlling suppression and resumption of HWPF in the three hierarchical levels will be described below. Since the configuration and operation in the case where the processor includes cache memory having a hierarchical structure of 4 or more hierarchical levels are easily understandable by generalizing the configuration and operation of the present embodiment, the illustration and description thereof will be omitted.

Figure 12:
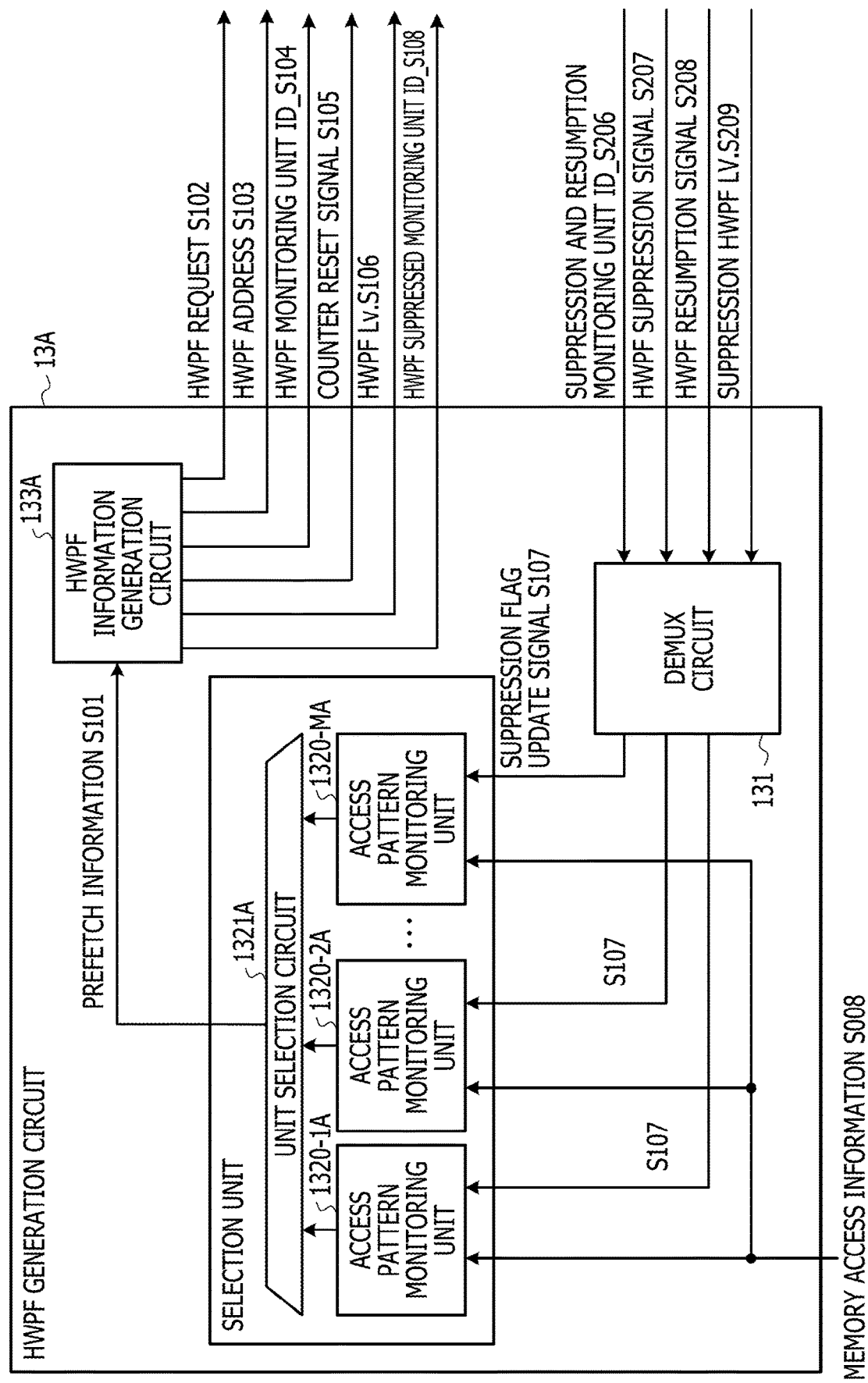
FIG. 12 is a block diagram illustrating an example of a HWPF generation circuit according to a second embodiment.

FIG. 12 is a block diagram illustrating an example of a HWPF generation circuit in the second embodiment. FIG. 13 is a diagram illustrating an example of a configuration of an access pattern monitoring unit illustrated in FIG. 12. In FIGS. 12 and 13, components that are the same as or similar to those illustrated in FIGS. 6 and 8 are denoted by the same reference numerals. Thus, a description thereof will be omitted.

A HWPF generation circuit 13A illustrated in FIG. 12 is based on the configuration of the HWPF generation circuit 13 illustrated in FIG. 6. The HWPF generation circuit 13A additionally outputs a HWPF suppressed monitoring unit ID_S108 for resuming L1HWPF. The HWPF generation circuit 13A includes the DEMUX circuit 131, a selection unit 132A, and a HWPF information generation circuit 133A. The selection unit 132A includes M access pattern monitoring units 1320-1A to 1320-MA and a unit selection circuit 1321A. The access pattern monitoring unit 1320-iA (i=1 to M) has a configuration illustrated in FIG. 13. The access pattern monitoring unit 1320-iA illustrated in FIG. 13 includes an L3HWPF distance, an L1HWPF suppression flag, and an L3HWPF suppression flag, in addition to the configuration illustrated in FIG. 8. In the configuration of FIG. 13, the prefetch distances to be added when HWPF is requested to each hierarchical level further include the L3HWPF distance. The configuration illustrated in FIG. 13 also includes the L1HWPF suppression flag, the L2HWPF suppression flag, and the L3HWPF suppression flag respectively supplied from the HWPF suppression and resumption circuits 26A, 26A-1, and 26B used in the present embodiment. The M access pattern monitoring units 1320-1A to 1320-MA store different prefetch information and independently generate prefetch information. The HWPF generation circuit 13A illustrated in FIG. 12 requests L1HWPF, L2HWPF, and L3HWPF by outputting the HWPF request S102 and the HWPF Lv. S106 by using the access pattern monitoring unit 1320-1A to 1320-MA having the configuration illustrated in FIG. 13.

The configurations of the HWPF suppression and resumption circuits 26A, 26A-1, and 26B for controlling suppression of HWPF to respective hierarchical levels may be the same as that of the HWPF suppression and resumption circuit 26 illustrated in FIG. 7. The configuration of the prefetching control table 267 illustrated in FIG. 7 may be the same as that illustrated in FIG. 8. Thus, a description thereof will be omitted. In the present embodiment, the access pattern monitoring unit 1320-iA further includes the L3HWPF distance, the L1HWPF suppression flag, and the L3HWPF suppression flag. By using the configuration as described below, HWPF to a given n-th hierarchical level may be suppressed.

Figure 14:
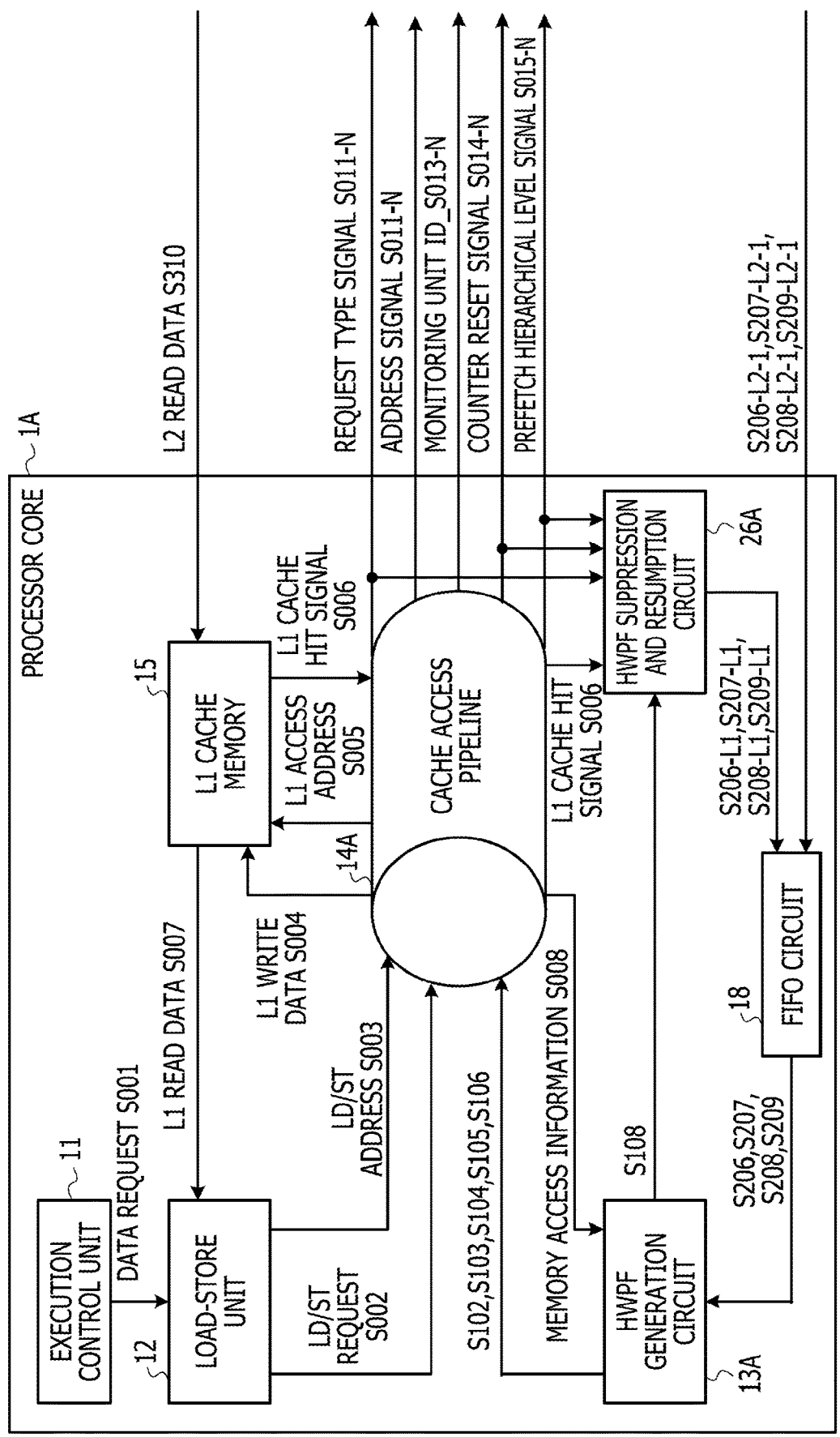
FIG. 14 is a block diagram illustrating an example of a processor core according to the second embodiment.
Figure 15:
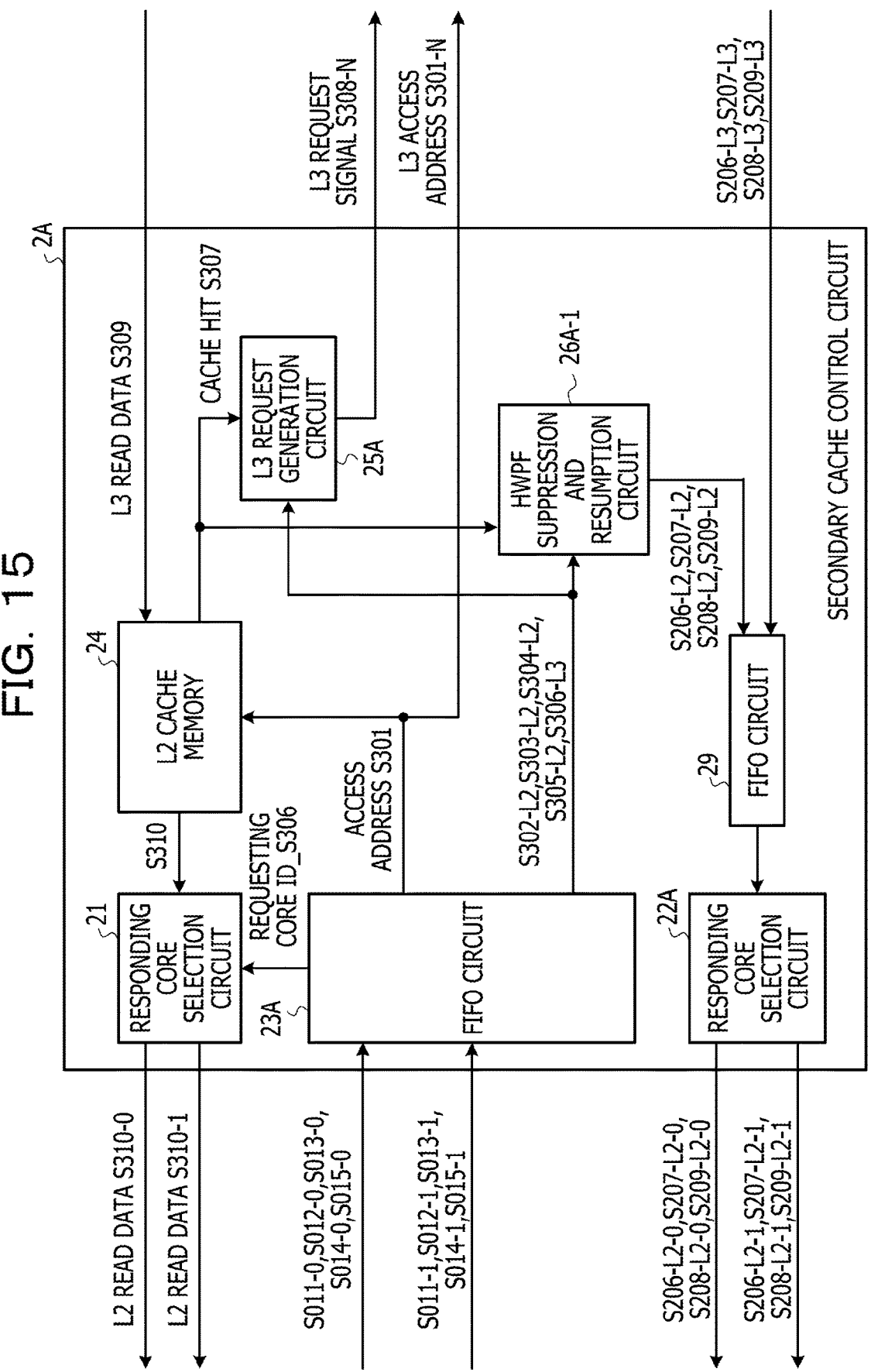
FIG. 15 is a block diagram illustrating an example of a secondary cache control circuit according to the second embodiment.
Figure 16:
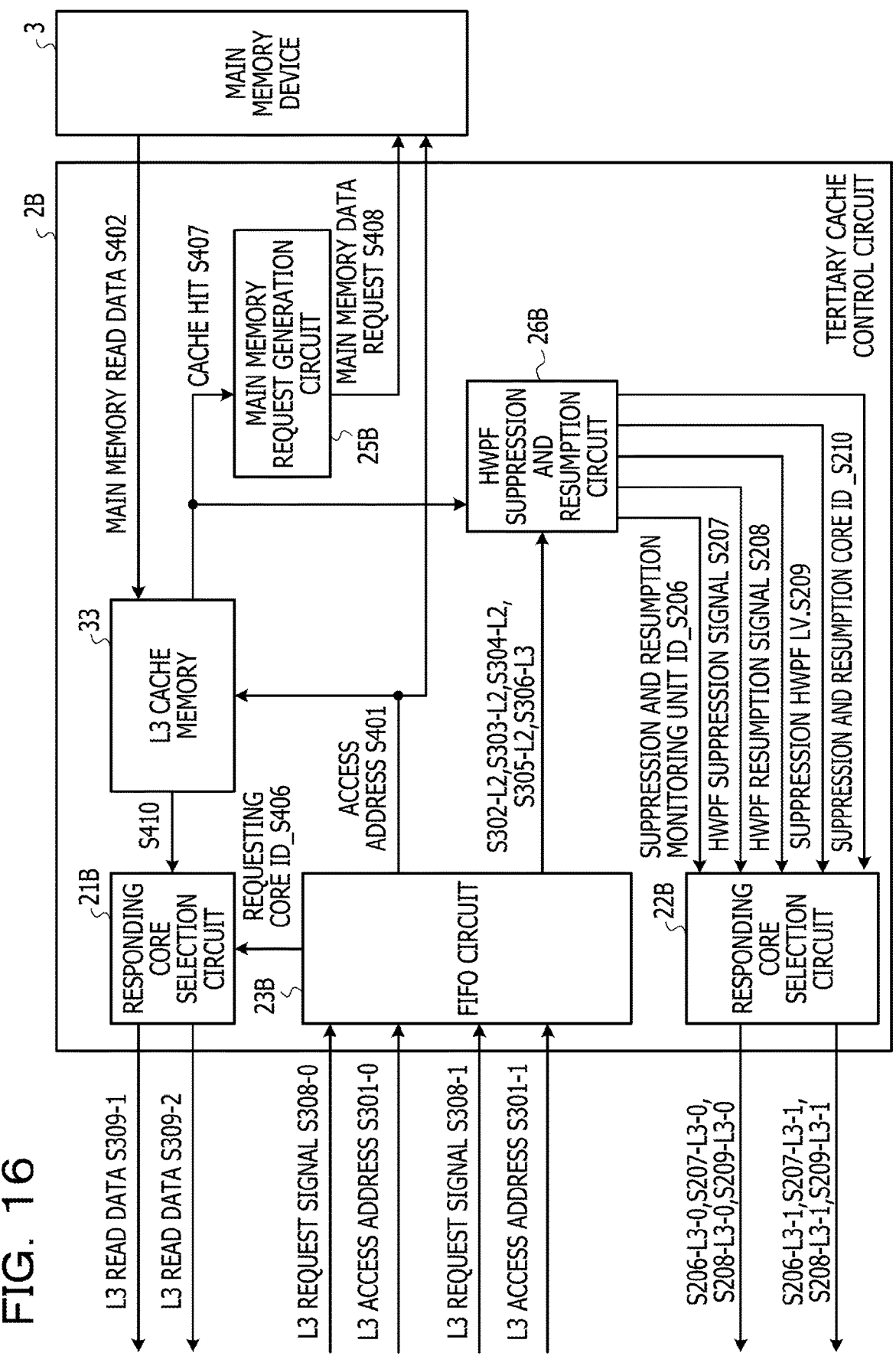
FIG. 16 is a block diagram illustrating an example of a tertiary cache control circuit and a main memory device according to the second embodiment.

FIG. 14 is a block diagram illustrating an example of a processor core according to the second embodiment. FIG. 15 is a block diagram illustrating an example of a secondary cache control circuit according to the second embodiment. FIG. 16 is a block diagram illustrating an example of a tertiary cache control circuit and a main memory device according to the second embodiment. In FIGS. 14, 15, and 16, components that are the same as or similar to those illustrated in FIGS. 4 and 5 are denoted by the same reference numerals. Thus, a description thereof will be omitted.

A processor core 1A illustrated in FIG. 14 is based on the configuration of the processor core 1 illustrated in FIG. 4. The processor core 1A includes the HWPF generation circuit 13A illustrated in FIG. 12, a cache access pipeline 14A, a FIFO circuit 18, the (L1) HWPF suppression and resumption circuit 26A, and so on. The HWPF generation circuit 13A monitors memory access information output from the cache access pipeline 14A, which is also used for the LD/ST instruction, and generates prefetch requests for hierarchical levels Lv. of 1 and 2 from the access patterns. The HWPF suppression and resumption circuit 26A is based on the configuration of the HWPF suppression and resumption circuit 26 illustrated in FIG. 7.

A secondary cache control circuit 2A illustrated in FIG. 15 is based on the configuration of the secondary cache control circuit 2 illustrated in FIG. 5. The secondary cache control circuit 2A includes the (L2) HWPF suppression and resumption circuit 26A-1, which is based on the HWPF suppression and resumption circuit 26 illustrated in FIG. 7 for suppressing L1HWPF. The secondary cache control circuit 2A illustrated in FIG. 15 includes responding core selection circuits 21 and 22A, a FIFO circuit 23A, the L2 cache memory 24, an L3 request generation circuit 25A, the HWPF suppression and resumption circuit 26A-1, and a FIFO circuit 29.

FIG. 16 illustrates the configuration of a tertiary cache control circuit 2B together with the main memory device 3. The tertiary cache control circuit 2B illustrated in FIG. 16 is based on the configuration of the secondary cache control circuit 2 illustrated in FIG. 5. The tertiary cache control circuit 2B includes the (L3) HWPF suppression and resumption circuit 26B, which is based on the configuration of the HWPF suppression and resumption circuit 26 illustrated in FIG. 7 for suppressing L1HWPF. The tertiary cache control circuit 2B illustrated in FIG. 16 includes responding core selection circuits 21B and 22B, a FIFO circuit 23B, the L3 cache memory 33, a main memory request generation circuit 25B, and the HWPF suppression and resumption circuit 26B.

First, processes for suppressing and resuming L1HWPF will be described. One HWPF suppression and resumption circuit 26A illustrated in FIG. 14 is provided in each of the processor cores 1A. Therefore, the prefetching control table 267 holds entries, the number of which is equal to M that is the number of the access pattern monitoring units 1320-1A to 1320-MA. L1HWPF is suppressed in the same manner as the process related to L2HWPF described in the first embodiment above. Specifically, for example, the HWPF generation circuit 13A illustrated in FIG. 12 receives an L1HWPF suppression notification in response to observation of a cache hit, which indicates that L1HWPF results in a hit in the L1 cache memory 15 of the corresponding hierarchical level, a certain number of times.

In the first embodiment described above, a timing at which a prefetch request for an upper hierarchical level higher than the corresponding hierarchical level has reached the corresponding hierarchical level is used in control of the L2HWPF resumption counter. However, in the case of L1HWPF, since the corresponding hierarchical level is the uppermost hierarchical level, the first embodiment is not applicable without any modification. Thus, in the present embodiment, an L1 cache miss of a LD/ST instruction is used.

In the following description, a request that is not confirmed to be required but is made by prediction is referred to as a prefetch request, whereas a read/write request to a cache memory based on a LD/ST instruction is referred to a demand request because the read/write request is confirmed to be actually required.

In this example, the increment conditions of the resumption counter of L1HWPF are modified so that resumption is caused by a cache miss of the demand request. Further, the monitoring unit ID used for controlling suppression and resumption is not originally assigned to the demand request that is not HWPF. However, the HWPF generation circuit 13A monitors the memory access information S008 input during execution of the demand request. When the monitored information corresponds to the access pattern monitoring unit for which HWPF has been already suppressed, the HWPF suppression and resumption circuit 26A of the processor core 1A is notified of the corresponding monitoring unit ID as the HWPF suppressed monitoring unit ID_S108. The HWPF suppression and resumption circuit 26A uses the HWPF generation monitoring unit ID_S104 generated based on generation of HWPF as the monitoring unit ID in the case where the request type is HWPF. The HWPF suppression and resumption circuit 26A uses the HWPF suppressed monitoring unit ID_S108 corresponding to the current demand request, which the HWPF suppression and resumption circuit 26A is notified of by the HWPF generation circuit 13A, in the case where the request type is the demand request. When there is no suppressed monitoring unit ID corresponding to the demand request, the HWPF suppression and resumption circuit 26A is notified that there is no corresponding access pattern monitoring unit to avoid malfunction.

The control conditions of the L1HWPF suppression and resumption counters are, for example, as illustrated in FIG. 17. FIG. 17 is a diagram for describing an example of increment conditions of the suppression counter and the resumption counter. As illustrated in FIG. 17, the increment conditions of the suppression counter are that the suppression flag is 0, the hierarchical level of the prefetch request is equal to the corresponding hierarchical level, and a cache hit occurs in the cache memory of the corresponding hierarchical level. On the other hand, the increment conditions of the resumption counter are that the suppression flag is 1, the request type is a demand request, and a cache miss occurs in the cache memory of the corresponding hierarchical level.

Order arbitration is desirably performed between the suppression and resumption signal output by the HWPF suppression and resumption circuit 26A and the suppression and resumption signal notified by the L2 cache memory 24 before the HWPF generation circuit 13A is notified of the signals. Thus, the secondary cache control circuit 2A includes the FIFO circuit 29 in this example. The suppression and resumption signal notified by the L2 cache memory 24 is either a suppression and resumption signal related to the L2 cache memory 24 or a suppression and resumption signal related to the L3 cache memory 33, unlike in the first embodiment. The suppression and resumption signal related to the L2 cache memory 24 or the suppression and resumption signal related to the L3 cache memory 33 is a signal that is output by the FIFO circuit 29 of the L2 cache memory 24 after being subjected to order arbitration.

Since a process for suppressing and resuming L2HWPF executed by the secondary cache control circuit 2A may be executed in a manner similar to that of the first embodiment, only the changes from the first embodiment will be described. A change in processing related to the L2 cache memory 24 from the first embodiment described above is that, in the case of a miss in the L2 cache memory 24, the L3 request generation circuit 25A generates an L3 request signal S308 for the L3 cache memory 33 instead of the main memory device 3. Another change is that the FIFO circuit 23A adds a HWPF request S302-L2, a monitoring unit ID_S303-L2, a counter reset signal S304-L2, a prefetch hierarchical level signal S305-L2, and a requesting core ID_S306-L2 supplied from the HWPF generation circuit 13A in the case of HWPF. The secondary cache control circuit 2A generates the L3 request signal S308 for the L3 cache memory 33, together with the L3 access address S301 supplied from the FIFO circuit 23A, by using these signals.

A process for suppressing and resuming L3HWPF executed by the tertiary cache control circuit 2B may be executed in a manner similar to that of the process for suppressing and resuming L2HWPF according to the first embodiment by using the HWPF information notified from the L2 cache memory 24. In the L3HWPF suppression process, the suppression counter and the suppression flag are managed based on an L3 cache hit in L3HWPF and the HWPF generation circuit 13A of the processor core 1A serving as the issuance source is notified of suppression of L3HWPF through the L2 cache memory 24 when the suppression flag is set. In the L3HWPF resumption process, the resumption counter and the suppression flag are managed based on an L3 cache miss in L2HWPF and the HWPF generation circuit 13A of the processor core 1A serving as the issuance source is notified of resumption of L3HWPF through the L2 cache memory 24 when the suppression flag is reset.

As described above, in the present embodiment, a process similar to that of the first embodiment is applicable independently for L1HWPF, L2HWPF, and L3HWPF.

According to each of the embodiments described above, the performance of the processor may be improved by suppressing only redundant unnecessary prefetching while maintaining an effective prefetch request. In addition, efficient cache control may be implemented by resuming the issuance of suppressed prefetching after detecting that the prefetching is effective again. Such efficient cache control may also improve the performance of the processor.

Although an arithmetic processing unit and a method for controlling an arithmetic processing unit have been described using the embodiments above, it is needless to say that the present disclosure is not limited to the embodiments described above and various modifications and improvements may be made within the scope of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
  circuitry configured to
  add, for each of a plurality of prefetch requests, a respective identifier indicating a request source that generates a respective prefetch request, and
  output a notification in response to detecting that a number of cache hits with respect to any of the identifiers added to the plurality of prefetch requests is equal to or greater than a threshold, each of the cache hits occurring in a first cache memory provided at a lower hierarchical level than a second cache memory by each prefetch request associated with the any of the identifiers, the notification being a notification for suppressing a prefetch request issued for the first cache memory from a request source identified by the any of the identifiers.

2. The arithmetic processing device according to claim 1, wherein the circuitry is further configured to
  generate a first prefetch request in accordance with an access pattern by monitoring memory access information generated based on a memory access request and an address, and
  increment, when a cache hit occurs as a result of a search performed in the first cache memory in response to the first prefetch request, a value of a counter indicating a number of times of a cache hit corresponding to a second identifier added into the first prefetch request.

3. The arithmetic processing device according to claim 2, wherein the memory access request is a load instruction or a store instruction.

4. The arithmetic processing device according to claim 1, wherein the circuitry is further configured to output, in response to detecting a certain number of cache misses not less than a second threshold for a request source identified by a second identifier whose prefetching to the first cache memory is suppressed, each of the cache misses occurring in the first cache memory based on each of other cache misses in the second cache memory, a notification for cancelling suppression for the request source identified by the second identifier.

5. The arithmetic processing device according to claim 1, wherein the circuitry is further configured to
  output, to the second cache memory, a second prefetch request from a request source identified by a second identifier whose prefetching to the first cache memory is suppressed,
  output, to the first cache memory, the second prefetch request when a cache miss occurs as a result of a search performed in the second cache memory in response to the second prefetch request, and
  increment, when another cache miss occurs as a result of a search performed in the first cache memory in response to the second prefetch request, a value of a counter indicating a number of times of a cache miss corresponding to the second identifier.

6. The arithmetic processing device according to claim 1, wherein the circuitry is further configured to generate a prefetch request corresponding to one of access patterns of a plurality of variables used by a program.

7. The arithmetic processing device according to claim 1, wherein the circuitry includes
  two processor cores, each of the two processor cores includes each the first cache memory separately, and
  the two processor cores share the second cache memory.

8. The arithmetic processing device according to claim 1, wherein the circuitry includes
  two second cache memories, each of the two second cache memories being the second cache memory, and
  a third cache memory that is provided at a lower hierarchical level than the two second cache memories and is shared by the two second cache memories.

9. An arithmetic processing method comprising:
  adding, for each of a plurality of prefetch requests, a respective identifier indicating a request source that generates a respective prefetch request; and
  outputting a notification in response to detecting that a number of cache hits with respect to any of the identifiers added to the plurality of prefetch requests is equal to or greater than a threshold, each of the cache hits occurring in a first cache memory provided at a lower hierarchical level than a second cache memory by each prefetch request associated with the any of the identifiers, the notification being a notification for suppressing a prefetch request issued for the first cache memory from a request source identified by the any of the identifiers.

10. The arithmetic processing method according to claim 9, further comprising:
generating a first prefetch request in accordance with an access pattern by monitoring memory access information generated based on a memory access request and an address; and
incrementing, when a cache hit occurs as a result of a search performed in the first cache memory in response to the first prefetch request, a value of a counter indicating a number of times of a cache hit corresponding to a second identifier added into the first prefetch request.

11. The arithmetic processing method according to claim 10, wherein the memory access request is a load instruction or a store instruction.

12. The arithmetic processing method according to claim 9, further comprising: outputting, in response to detecting a certain number of cache misses not less than a second threshold for a request source identified by a second identifier whose prefetching to the first cache memory is suppressed, each of the cache misses occurring in the first cache memory based on each of other cache misses in the second cache memory, a notification for cancelling suppression for the request source identified by the second identifier.

13. The arithmetic processing method according to claim 9, further comprising:
outputting, to the second cache memory, a second prefetch request from a request source identified by a second identifier whose prefetching to the first cache memory is suppressed;
outputting, to the first cache memory, the second prefetch request when a cache miss occurs as a result of a search performed in the second cache memory in response to the second prefetch request; and
incrementing, when another cache miss occurs as a result of a search performed in the first cache memory in response to the second prefetch request, a value of a counter indicating a number of times of a cache miss corresponding to the second identifier.

14. The arithmetic processing method according to claim 9, further comprising: generating a prefetch request corresponding to one of access patterns of a plurality of variables used by a program.

* * * * *